United States Patent
Sato et al.

(10) Patent No.: US 9,736,226 B2
(45) Date of Patent: Aug. 15, 2017

(54) RULE DISTRIBUTION SERVER, EVENT PROCESSING SYSTEM AND METHOD, AND PROGRAM

(71) Applicant: NEC Corporation, Tokyo (JP)

(72) Inventors: Tadashi Sato, Tokyo (JP); Kazuhiko Isoyama, Tokyo (JP)

(73) Assignee: NEC Corporation, Tokyo (JP)

(*) Notice: Subject to any disclaimer, the term of this patent is extended or adjusted under 35 U.S.C. 154(b) by 168 days.

(21) Appl. No.: 14/435,694

(22) PCT Filed: Oct. 9, 2013

(86) PCT No.: PCT/JP2013/077407
§ 371 (c)(1),
(2) Date: Apr. 14, 2015

(87) PCT Pub. No.: WO2014/065115
PCT Pub. Date: May 1, 2014

(65) Prior Publication Data
US 2015/0271252 A1    Sep. 24, 2015

(30) Foreign Application Priority Data
Oct. 23, 2012 (JP) ................ 2012-233373

(51) Int. Cl.
*G06F 15/16* (2006.01)
*H04L 29/08* (2006.01)
(Continued)

(52) U.S. Cl.
CPC .............. *H04L 67/10* (2013.01); *G06F 9/445* (2013.01); *G06F 9/50* (2013.01); *G06F 9/542* (2013.01); *H04L 67/12* (2013.01)

(58) Field of Classification Search
CPC . G06F 9/542; G06F 9/50; H04L 67/10; H04L 67/12
(Continued)

(56) References Cited

U.S. PATENT DOCUMENTS

2010/0333114 A1   12/2010   Isoyama
2011/0252433 A1   10/2011   Isoyama

FOREIGN PATENT DOCUMENTS

JP         2009-217402 A       9/2009
WO     WO-2010/071162 A1       6/2010
(Continued)

OTHER PUBLICATIONS

Extended European Search Report issued by the European Patent Office for Application No. 13848717.8 dated Jun. 15, 2016 (7 pages).
(Continued)

*Primary Examiner* — David Lazaro
(74) *Attorney, Agent, or Firm* — Wilmer Cutler Pickering Hale and Dorr LLP

(57) ABSTRACT

A rule distribution server, on the basis of event conditions, calculates the ID of a front-end network in which events matching the event conditions occur, and if all events matching each of the event conditions specified with an application rule occur at the same front-end network, the rule is registered with a processing server for the front-end network, and if the events do not occur, the rule is determined to be registered with a back-end processing server, whereupon, for rules registered in the back-end processing server, with a front-end processing server, at which events that match the event condition for each event condition occur, as a registration destination, a rule to transfer events matching the event condition to a back-end processing
(Continued)

server is generated, and the application rule and the transfer rule are registered in the processing servers.

9 Claims, 24 Drawing Sheets

(51) Int. Cl.
*G06F 9/54* (2006.01)
*G06F 9/445* (2006.01)
*G06F 9/50* (2006.01)

(58) Field of Classification Search
USPC .......................................... 709/201, 205, 226
See application file for complete search history.

(56) References Cited

FOREIGN PATENT DOCUMENTS

WO  WO-2010/107107 A1  9/2010
WO  WO-2011/052102 A1  5/2011

OTHER PUBLICATIONS

Tadashi Sato et al., "Distributed Complex Event Processing for Context-Aware Services," IPSJ Symposium Series, vol. 2008, No. 1, Symposium on Multimedia, Distributed, Cooperative and Mobile Systems (DICOMO2008) Ronbunshu, Jul. 2008, pp. 975-981, 11 pages.
International Search Report, Corresponding to PCT/JP2013/077407, dated Nov. 12, 2013, 1 page.
Japanese Office Action issued by the Japan Patent Office for Japanese Application No. 2014-543219 dated Jun. 20, 2017 (2 pages)

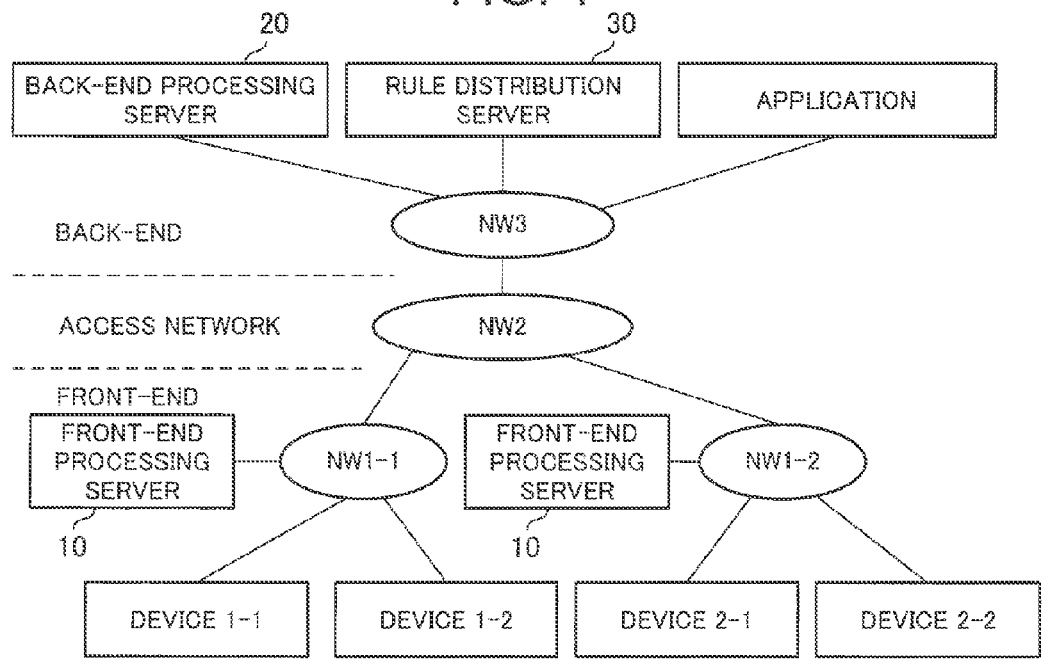
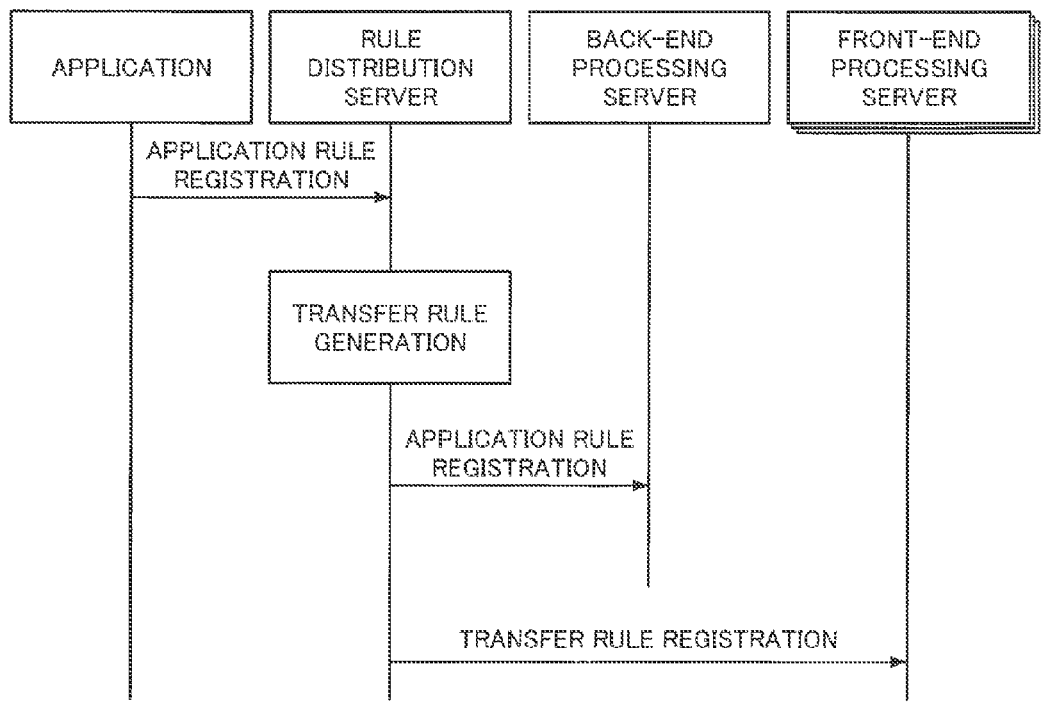

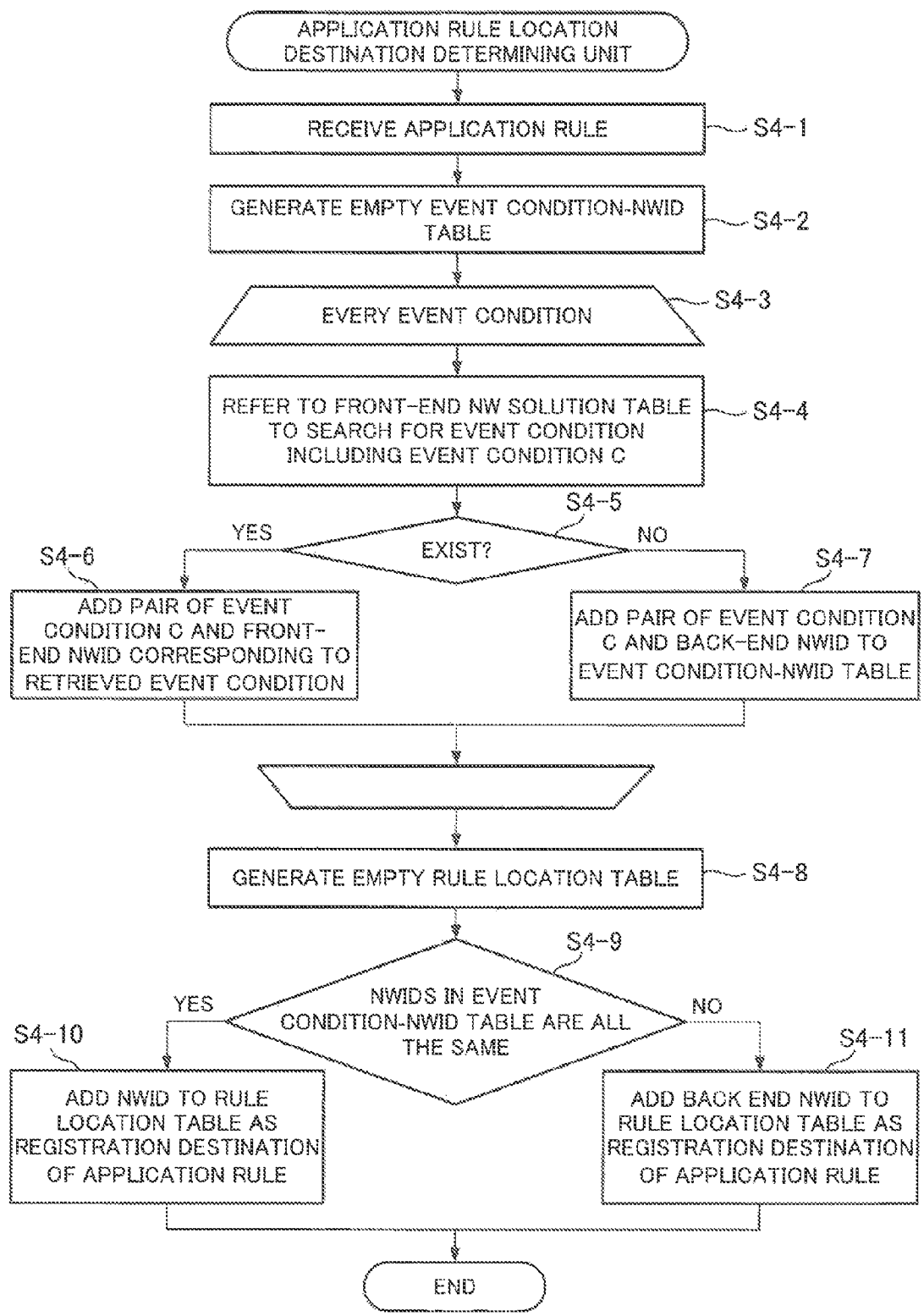

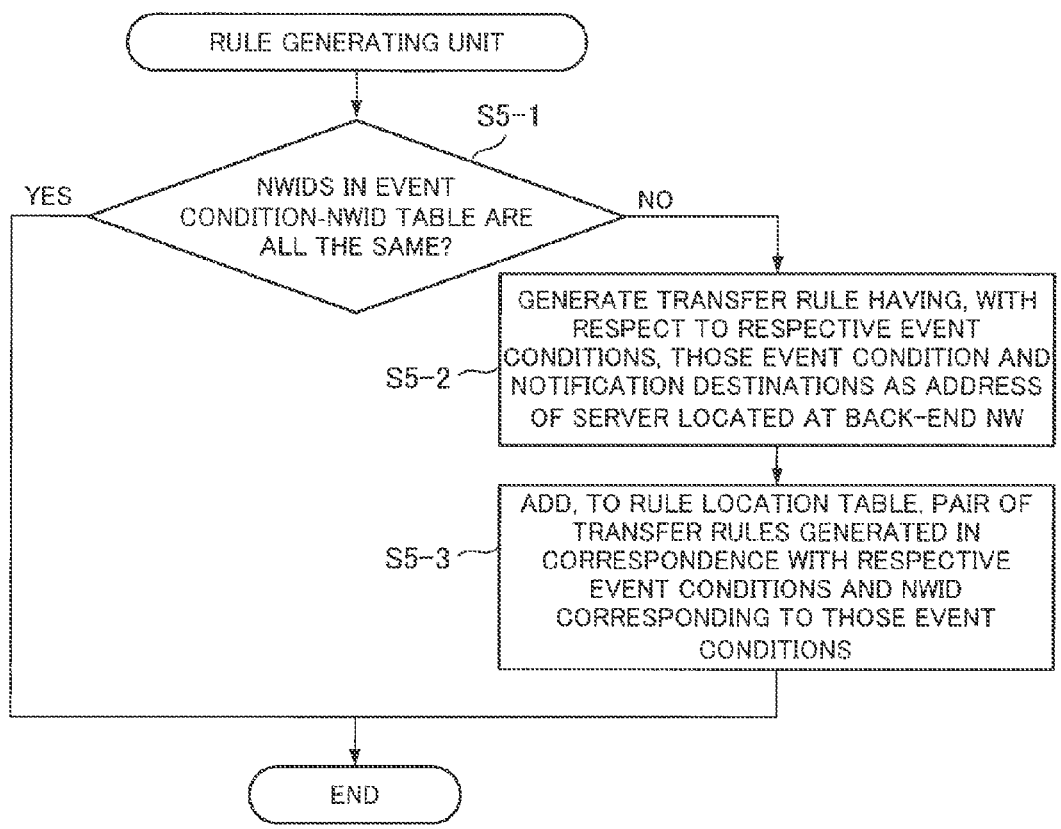
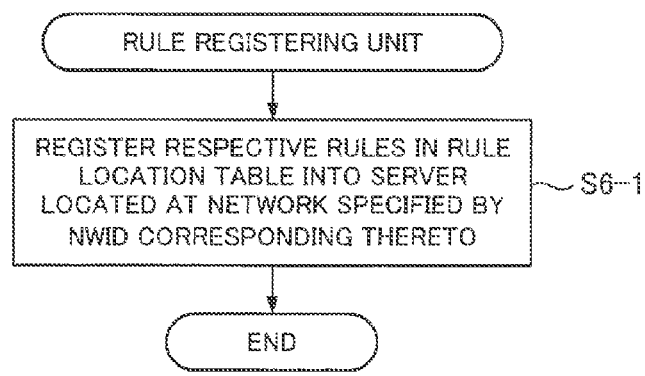

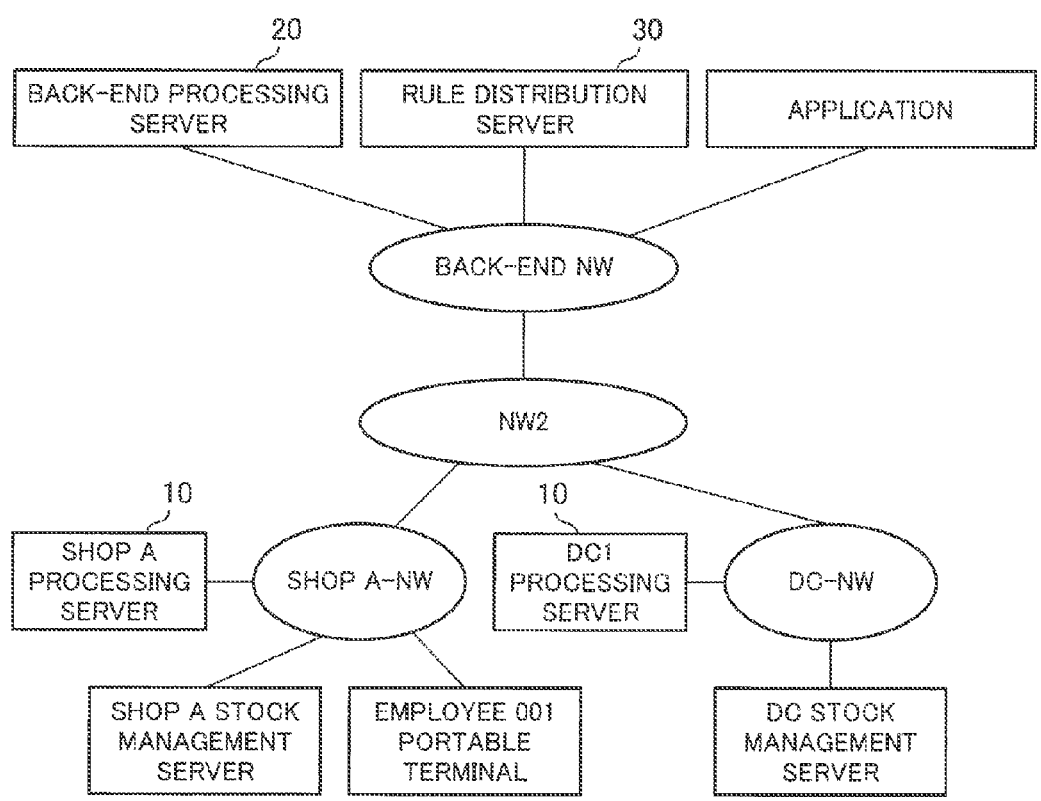

FIG. 8

EVENT EXAMPLE

EVENT D1

| ATTRIBUTE NAME | ATTRIBUTE VALUE |
|---|---|
| EVENT KIND | SHOP STOCK EVENT |
| CENTER NAME | SHOP A |
| GOODS KIND | LLL |
| UPDATING TIME | 12:30:25 |
| NUMBER OF GOODS AT SHOP | 1 |
| NUMBER OF BACKYARD GOODS | 10 |

EVENT D2

| ATTRIBUTE NAME | ATTRIBUTE VALUE |
|---|---|
| EVENT KIND | SHOP STOCK EVENT |
| CENTER NAME | SHOP A |
| GOODS KIND | LLL |
| UPDATING TIME | 16:30:00 |
| NUMBER OF GOODS AT SHOP | 1 |
| NUMBER OF BACKYARD GOODS | 0 |

FIG. 9

EVENT D3

| ATTRIBUTE NAME | ATTRIBUTE VALUE |
| --- | --- |
| EVENT KIND | EMPLOYEE POSITION EVENT |
| EMPLOYEE ID | 001 |
| TIME | 12:30:25 |
| CURRENT POSITION | BACKYARD |

FIG. 10

EVENT D4

| ATTRIBUTE NAME | ATTRIBUTE VALUE |
| --- | --- |
| EVENT KIND | DC STOCK EVENT |
| CENTER NAME | DC1 |
| GOODS KIND | LLL |
| UPDATING TIME | 16:25:00 |
| NUMBER OF STOCKS | 50 |

FIG. 11

APPLICATION RULE

| RULE ID | COMPOSITE EVENT CONDITION | ACTION |
|---|---|---|
| RULE 1 | (EVENT CONDITION 11) & (EVENT CONDITION 12) within 1 min. | TRANSMIT SUPPLEMENTARY INSTRUCTION MESSAGE TO PORTABLE TERMINAL OF EMPLOYEE IN CORRESPONDENCE WITH EVENT CONDITION 12 |

EVENT CONDITION 11

| ATTRIBUTE NAME | ATTRIBUTE VALUE |
|---|---|
| EVENT KIND | SHOP STOCK EVENT |
| CENTER NAME | SHOP A |
| GOODS KIND | LLL |
| UPDATING TIME | * |
| NUMBER OF GOODS AT SHOP | $\leq 1$ |
| NUMBER OF BACKYARD GOODS | $> 0$ |

EVENT CONDITION 12

| ATTRIBUTE NAME | ATTRIBUTE VALUE |
|---|---|
| EVENT KIND | EMPLOYEE POSITION EVENT |
| EMPLOYEE ID | 001 |
| TIME | * |
| CURRENT POSITION | BACKYARD |

FIG. 12

APPLICATION RULE

| RULE ID | COMPOSITE EVENT CONDITION | ACTION |
|---|---|---|
| RULE 2 | (EVENT CONDITION 21) & (EVENT CONDITION 22) within 1 min. | TRANSMIT DELIVERY REQUEST MESSAGE TO DELIVERY RECEIVING SERVER OF DC1 |

EVENT CONDITION 21

| ATTRIBUTE NAME | ATTRIBUTE VALUE |
|---|---|
| EVENT KIND | SHOP STOCK EVENT |
| CENTER NAME | SHOP A |
| GOODS KIND | LLL |
| UPDATING TIME | * |
| NUMBER OF GOODS AT SHOP | * |
| NUMBER OF BACKYARD GOODS | <3 |

EVENT CONDITION 22

| ATTRIBUTE NAME | ATTRIBUTE VALUE |
|---|---|
| EVENT KIND | DC STOCK EVENT |
| CENTER NAME | DC1 |
| GOODS KIND | LLL |
| UPDATING TIME | * |
| NUMBER OF STOCKS | >0 |

FIG. 13

EVENT GENERATION SOURCE NW SOLUTION TABLE

| EVENT CONDITION || EVENT GENERATION SOURCE NWID |
|---|---|---|
| ATTRIBUTE NAME | ATTRIBUTE VALUE | SHOP A-NW |
| EVENT KIND | SHOP STOCK EVENT | |
| CENTER NAME | SHOP A | |
| GOODS KIND | * | |
| UPDATING TIME | * | |
| NUMBER OF GOODS AT SHOP | * | |
| NUMBER OF BACKYARD GOODS | * | |
| ATTRIBUTE NAME | ATTRIBUTE VALUE | DC1-NW |
| EVENT KIND | DC STOCK EVENT | |
| CENTER NAME | DC1 | |
| GOODS KIND | * | |
| UPDATING TIME | * | |
| NUMBER OF STOCKS | * | |
| ATTRIBUTE NAME | ATTRIBUTE VALUE | SHOP A-NW |
| EVENT KIND | SHOP STOCK EVENT | |
| EMPLOYEE ID | 001 | |
| TIME | * | |
| CURRENT TIME | * | |

FIG. 14

EVENT CONDITION-NWID TABLE (RULE 1)

| COMPOSITE EVENT CONDITION | NWID |
|---|---|
| EVENT CONDITION 11 | SHOP A-NW |
| EVENT CONDITION 12 | SHOP A-NW |

FIG. 15

RULE LOCATION TABLE (RULE 1)

| RULE | | | NWID |
|---|---|---|---|
| RULE ID | COMPOSITE EVENT CONDITION | ACTION | SHOP A-NW |
| RULE 1 | (EVENT CONDITION 11) & (EVENT CONDITION 12) within 1 min. | TRANSMIT SUPPLEMENTARY INSTRUCTION MESSAGE TO PORTABLE TERMINAL OF EMPLOYEE IN CORRESPONDENCE WITH CONDITION B | |

FIG. 16

EVENT CONDITION-NWID TABLE (RULE 2)

| COMPOSITE EVENT CONDITION | NWID |
|---|---|
| EVENT CONDITION 21 | SHOP A-NW |
| EVENT CONDITION 22 | DC1-NW |

FIG. 17

RULE LOCATION TABLE (RULE 2)

| RULE | | | NWID |
|---|---|---|---|
| RULE ID | COMPOSITE EVENT CONDITION | ACTION | BACK-END NW |
| RULE 2 | (EVENT CONDITION 21) & (EVENT CONDITION 22) within 10 min. | TRANSMIT DELIVERY REQUEST MESSAGE TO STOCK MANAGEMENT SERVER OF DC1 | |
| RULE ID | COMPOSITE EVENT CONDITION | ACTION | SHOP A-NW |
| RULE 2-1 | EVENT CONDITION 21 | NOTIFY BACK-END PROCESSING SERVER OF EVENT | |
| RULE ID | COMPOSITE EVENT CONDITION | ACTION | DC1-NW |
| RULE 2-2 | EVENT CONDITION 22 | NOTIFY EVENT TO BACK-END PROCESSING SERVER | |

FIG. 23

APPEARANCE NUMBER TABLE WHERE EVENT KIND IS "EMPLOYEE POSITION", AND ATTRIBUTE NAME IS "EMPLOYEE ID"

|  | SHOP A-NW | SHOP B-NW | SHOP C-NW |
|---|---|---|---|
| 001 | 10 | 0 | 0 |
| 002 | 0 | 8 | 0 |
| ⋮ | ⋮ | ⋮ | ⋮ |

FIG. 24

EVENT GENERATION SOURCE NW SOLUTION TABLE

| EVENT CONDITION | | EVENT GENERATION SOURCE NWID |
|---|---|---|
| ATTRIBUTE NAME | ATTRIBUTE VALUE CONDITION | SHOP A-NW |
| EVENT KIND | EMPLOYEE POSITION EVENT | |
| EMPLOYEE ID | 001 | |
| TIME | * | |
| CURRENT POSITION | * | |
| ATTRIBUTE NAME | ATTRIBUTE VALUE CONDITION | SHOP B-NW |
| EVENT KIND | EMPLOYEE POSITION EVENT | |
| EMPLOYEE ID | 002 | |
| TIME | * | |
| CURRENT POSITION | * | |

APPEARANCE NUMBER TABLE WHERE EVENT KIND IS
"EMPLOYEE POSITION" AND ATTRIBUTE NAME IS "EMPLOYEE ID"

| | SHOP A-NW | SHOP B-NW | SHOP C-NW |
|---|---|---|---|
| 001 | 0 | 10 | 0 |
| ⋮ | ⋮ | ⋮ | ⋮ |

FIG. 30

EVENT GENERATION SOURCE NW SOLUTION TABLE

| EVENT CONDITION | | EVENT GENERATION SOURCE NWID |
|---|---|---|
| ATTRIBUTE NAME | ATTRIBUTE VALUE | SHOP B-NW |
| EVENT KIND | SHOP STOCK EVENT | |
| EMPLOYEE ID | 001 | |
| TIME | * | |
| CURRENT POSITION | * | |
| ⁝ | | ⁝ |

FIG. 31

RULE LOCATION TABLE (RULE 1)

| RULE | | | NWID |
|---|---|---|---|
| RULE ID | COMPOSITE EVENT CONDITION | ACTION | SHOP A-NW |
| RULE 1 | (EVENT CONDITION 11) & (EVENT CONDITION 12) within 1 min. | TRANSMIT SUPPLEMENTARY INSTRUCTION MESSAGE TO PORTABLE TERMINAL OF EMPLOYEE IN CORRESPONDENCE WITH CONDITION B | |
| RULE ID | COMPOSITE EVENT CONDITION | ACTION | SHOP B-NW |
| RULE 1-1 | EVENT CONDITION 11 | NOTIFY EVENT TO SHOP A-NW PROCESSING SERVER | |
| RULE ID | COMPOSITE EVENT CONDITION | ACTION | SHOP B-NW |
| RULE 1-2 | EVENT CONDITION 12 | NOTIFY EVENT TO SHOP A-NW PROCESSING SERVER | |

RULE DISTRIBUTION SERVER, EVENT PROCESSING SYSTEM AND METHOD, AND PROGRAM

CROSS-REFERENCE TO RELATED APPLICATIONS

The present application is a national stage application of International Application No. PCT/JP2013/077407 entitled "Rule Distribution Server, Event Processing System and Method, and Program," filed on Oct. 9, 2013, which claims the benefit of priority from Japanese Patent Application No. JP2012-233373, filed on Oct. 23, 2012, the disclosures of which are incorporated herein in their entirety by reference thereto.

TECHNICAL FIELD

The present invention relates to an event processing system for processing a large amount of data (events) generated from a large number of devices.

BACKGROUND ART

There are devised event processing systems for processing events in accordance with processing condition for events (processing rules) registered from application servers. For example, to process an event based on a processing rule, an event processing system of PTL 1 registers, into all dispatchers, the conditions for events to be transferred to a local system (external dispatch rule). Thus, when what event is generated from what event generating source, the event is transferred through the external dispatcher to the local system in which that event is to be processed.

CITATION LIST

Patent Document

PTL 1: International Patent Publication No. 2010/107107

SUMMARY OF INVENTION

Technical Problem

However, in the system of PTL 1, when the number of event generating sources becomes extremely large and the number of events generated from the event generating sources becomes large, the amount of data flowing through a network between external dispatchers and local systems would become large. Thus, the amount of data flowing exceeds the capability of the network, and thus it might be difficult to transmit all events to be transferred to the local system.

The present invention has been made in view of the problem described above, and has an object to provide a rule distribution system, an event processing system, a method, and a program which are capable of suppressing increase in the amount of data flowing through the network even if the number of events generated from respective event generating sources becomes large.

Solution to Problem

The present invention is provided a rule distribution server operative to locate, on registering rules relating to event processing from an application server, rules at a front-end processing server connected to a front-end network to which an event generating source is connected and a back-end processing server connected to a back-end network, the rule distribution server including:

an event generating source network solving unit which calculates, from an event condition, ID of a front-end network where any event matching the event condition is generated;

an application rule location destination determining unit such that when events matching respective event conditions designated by application rules registered from application are all generated on the same front-end network, the application rule location destination determining unit registers the application rule into a processing server connected to the front-end network, while when the events are not generated, the application rule location destination determining unit registers the application rule into the back-end processing server;

a rule generating unit operative to generate such a processing rule to transfer an event matching the event condition to a back-end processing server, with a front-end processing server where the event matching the event condition is generated being as a registration destination every the event conditions with respect to an application rule which has been determined so that the rule is to be registered into the back-end processing server; and a rule registering unit operative to respectively register an application rule and a transfer rule generated at the rule generating unit into corresponding processing servers.

The present invention is provided an event processing system including:

a front-end processing server connected to a front-end network to which an event generating source is connected;

a back-end processing server operative to process events collected from processing servers of respective front-end networks; and a rule distribution server operative to generate, from application rules registered from an application into respective processing servers to locate the application rules and the generated transfer rules at the processing servers, wherein the rule distribution server includes:

an event generating source network solving unit operative to calculate, from an event condition, ID of the front-end network where any event matching the event condition is generated;

an application rule location destination determining unit such that when events matching the respective event conditions designated by the application rule are all generated on the same front-end network, the application rule location destination determining unit registers the application rule into the front-end network, while when otherwise, the application rule location destination determining unit that the application rule is registered into the back-end processing server;

a rule generating unit operative to generate a processing rule to transfer, with respect to an application rule determined so that the rule is registered into the back-end processing server, an event matching the event condition to the back-end processing server with a processing server or servers connected to the front-end network where events matching the event condition are generated for each event condition being as a registration destination or destinations; and a rule registering unit operative to register, into the processing server, the application rule and the transfer rule generated at the rule generating unit.

The present invention is provided a rule distribution method of locating, on registering a rule relating to an event processing from an application server, the rule at a front-end processing server connected to a front-end network to which an event generating source is connected and a back-end processing server connected to a back-end network, the rule distribution method including:

calculating, from an event condition, ID of a front-end network where any event matching the event condition is generated;

making a determination such that when events matching respective event conditions designated by application rules registered from an application are all generated on the same front-end network, the application rule is registered into a processing server connected to the front-end network, while when the events are not generated, the application rule is registered into the back-end processing server;

generating such a processing rule to transfer, to the back-end processing server, any event matching the event condition with a front-end processing server where any event matching the event conditions is generated being as a registration destination for each event condition with respect to an application rule which has been determined so that the rule is registered into the back-end processing server, and respectively registering the generated transfer rules into the corresponding processing servers.

The present invention is provided a program causing a computer connected to a front-end processing server connected to a front-end network to which an event generating source is connected, and a back-end processing source connected to a back-end network to execute:

a processing step of calculating, from an event condition, ID of a front-end network where any event matching the event condition is generated;

an application rule location destination determination processing step of making a determination such that when events matching respect to respective event conditions specified by an application rule registered from application are all generated on the same front-end network, the application rule is registered into a processing server connected to the front-end network, while when those events are not generated, the application rule is registered into the back-end processing server;

a rule generation processing step of generating a processing rule to transfer any event matching the event condition to the back-end processing server with the front-end processing server where the event matching the event condition is generated being as a registration destination for each event condition with respect to the application rule determined to be registered into the back-end processing server, and a rule registration processing step of respectively registering the generated transfer rule to the corresponding processing servers.

Advantageous Effects of Invention

According to the present invention, it is possible to suppress increase in the amount of data flowing through the network even if the number of events generated from respective event generating sources becomes large.

BRIEF DESCRIPTION OF DRAWINGS

FIG. 1 is a diagram illustrating the configuration of an event processing system according to a first exemplary embodiment of the present invention.

FIG. 2 is a diagram illustrating flow in the event processing system of processing according to the first exemplary embodiment.

FIG. 4 is a flowchart for explaining the operation of an application rule relocation destination determining unit of the first exemplary embodiment.

FIG. 5 is a flowchart for explaining the operation of a rule generating unit of the first exemplary embodiment.

FIG. 6 is a flowchart for explaining the operation of the rule registration unit of the first exemplary embodiment.

FIG. 7 is a diagram for explaining, by using a more practical example, the operation of the event processing system according to the first exemplary embodiment.

FIG. 8 is a diagram illustrating event generated from a shop A stock management server.

FIG. 9 is a diagram illustrating event generated from an employee 001 mobile terminal.

FIG. 10 is a diagram illustrating event generated from a DC1 stock management server.

FIG. 11 is a diagram illustrating a rule.

FIG. 12 is a diagram illustrating a rule.

FIG. 13 is a diagram illustrating an event generating source NW solution Table.

FIG. 14 is a diagram illustrating an event condition-NWID Table.

FIG. 15 is a diagram illustrating a rule location Table.

FIG. 16 is a diagram illustrating an event condition-NWID Table.

FIG. 17 is a diagram illustrating a rule location Table.

FIG. 23 is a diagram illustrating an appearance number Table.

FIG. 24 is a diagram illustrating an event generating source NW solution Table.

FIG. 30 is a diagram illustrating a rule location Table.

FIG. 31 is a diagram illustrating an event generating source NW solution Table.

DESCRIPTION OF EMBODIMENTS

Figure 3:
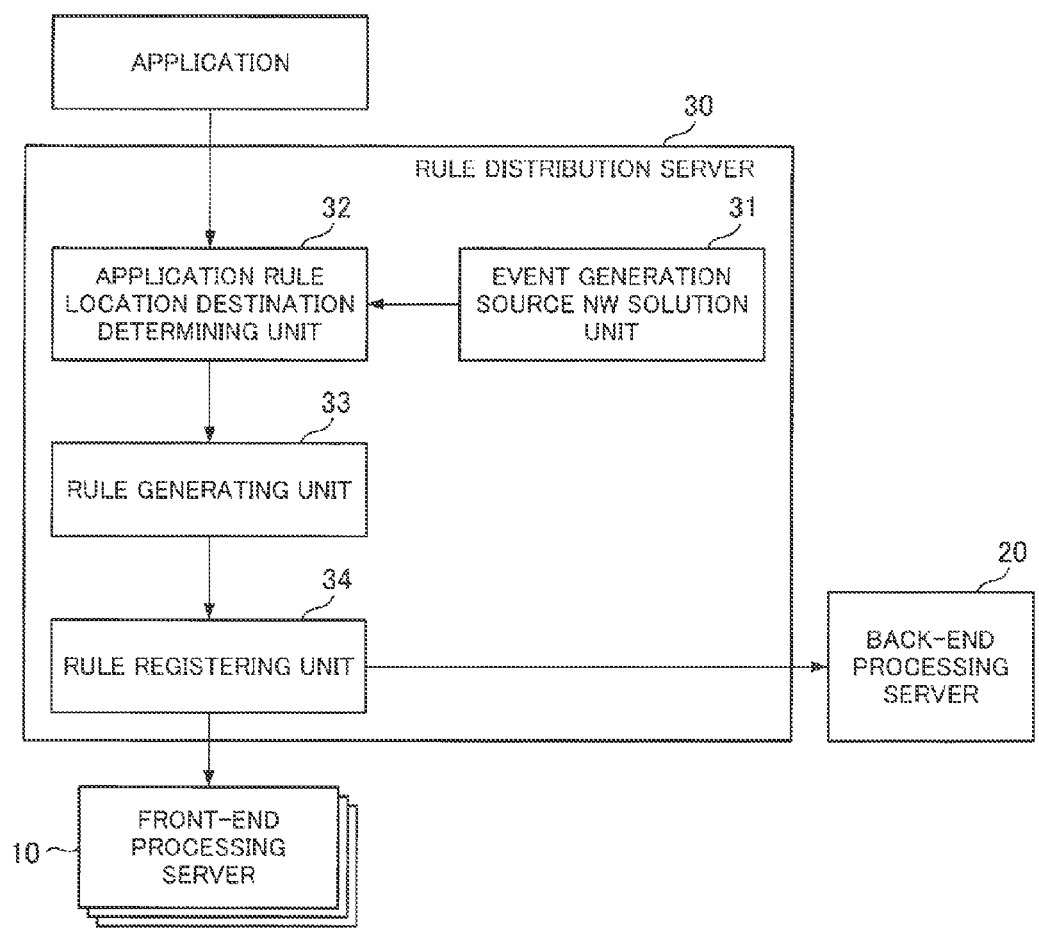
FIG. 3 is a diagram illustrating the configuration of a rule distribution server of the first exemplary embodiment.

Preferred exemplary embodiments will now be described with reference to the attached drawings.

First Exemplary Embodiment

The configuration of an event processing system according to the first exemplary embodiment of the present invention is illustrated in FIG. 1. The event processing system according to this exemplary embodiment includes front-end processing servers 10, a back-end processing server 20, and a rule distribution server 30, and these devices are connected through networks (NWs). The networks to which the respective processing servers (front-end processing servers 10 and back-end processing server 20) are connected are identified by network IDs (NWIDs).

Each front-end processing server 10 is a processing server connected to a network (front-end NW) to which respective devices serving as event generating sources are connected. The back-end processing server 20 is a processing server for processing events collected from the respective front-end processing servers 10. The rule distribution server 30 is subjected to registration of processing rule (application rule) of events by application of the application server connected through the network. The rule distribution server 30 generates, a processing rule (transfer rule) to be registered into respective processing servers, from processing rules (application rule) of events registered from the application, to relocate the application rule and the transfer rule thus generated on the corresponding respective processing servers.

As illustrated in FIG. 2, when the application rule is registered from application, this event processing system generates a transfer rule that the rule distribution server 30 registers into respective front-end processing servers 10 to register the application rule and the transfer rule thus generated into the respective front-end processing servers 10 and the respective back-end processing servers 20.

The configuration of the rule distribution server 30 is illustrated in FIG. 3. The rule distribution server 30 includes an event generating source NM solution unit 31, an application rule location destination determining unit 32, a rule generating unit 33, and a rule registration unit 34.

The event generating source NW solution unit 31 calculates, from the event condition, ID of a front-end network from which an event matching with the event condition is to be generated. Such calculation is performed, for example, by referring to the event generating source NW solution Table which stores a pair of an event condition and the ID of the front-end NW where an event matching the event condition is to be generated. The event generating source NW solution Table may be held by the rule distribution server 30, or may be held by any other server connected to a network. The application rule location destination determining unit 32 discriminates whether or not events that match respective event conditions specified by the application rule all being generated at the same front-end NW. When it is determined "generated", the rule relocation destination determining unit 32 determines that the application rule is to be registered into the front-end processing server 10 of the front-end NW, otherwise into the back-end processing server 20. In connection with a rule which has been determined to be registered into the back-end processing server 20, the rule generating unit 33 causes the front-end processing server 10 to be a destination of registration for each event condition, wherein the front-end processing server 10 is connected to the front-end NW where an event matching the event condition is generated. Further, the rule generating unit 33 generates a processing rule to transfer an event, which matches the event condition, to the back-end processing server 20. The rule registration unit 34 registers the application rule and the transfer rule generated with the rule generating unit 33 into corresponding back-end processing unit 20 and front-end processing server 10.

The operation of the application rule location destination determining unit 32 will be described with reference to FIG. 4.

When receiving the application rule (S4-1), the application rule location destination determining unit 32 generates an empty event condition-NWID Table for holding a pair of an event condition and ID of a network in which an event matching the event condition is generated (S4-2). The application rule location destination determining unit 32 refers to an event generating source NW solution Table, for each event condition C designated by the application rule, to retrieve an event condition including the event condition C (S4-3, 4-4). When such event condition exists in the event generating source NW solution Table (S4-5), the application rule location destination determining unit 32 adds a font end NWID corresponding to the retrieved event condition to the event condition-NWID Table in association with the event condition C (S4-6). When such event condition does not exist, the application rule location destination determining unit 32 adds ID (back-end NWID) of back-end network (back-end NW) to which the back-end processing server 20 is connected into the event condition-NWID Table in association with the event condition (S4-7).

The application rule location destination determining unit 32, after performing the above-described processing in connection with all event conditions, generates an empty rule relocation Table for holding pairs of rules and IDs of networks of registration destination of the rules (S4-8). When NWIDs in the event condition-NWID Table are the same (S4-9), the application rule relocation destination determining unit 32 adds the NWID to the rule relocation Table as a destination of registration of the application rule (S4-10). Otherwise, the back-end NWID is added into the rule relocation Table as the destination of registration of the application rule (S4-11).

The operation of the rule generating unit 33 will now be described with reference to the flowchart of FIG. 5.

When NWIDs in the event condition-NWID Table generated with the application rule location destination determining unit 32 are not all the same (S5-1), the rule generating unit 33 generates, for each event condition, a transfer rule to transfer an event that matches the event condition to a processing server connected to the back-end NW, (S5-2). Subsequently, the rule generating unit 33 adds, to the rule relocation Table, a pair of the transfer rule generated in connection with each event condition and the NWID corresponding to the event condition (S5-3).

The operation of the rule registration unit 34 will now be described with reference to the flowchart of FIG. 6.

The rule registration unit 34 registers respective rules in the rule location Table into a server located on a network specified by NWID corresponding thereto (S6-1). The rule registering unit 34 holds e.g., Table (not illustrated) for associating a back-end NWID and ID of a processing server located on the back-end NW to refer to the Table to thereby resolve address of the processing server from the NWID.

The processing when deleting the rule will now be described. For example, the rule generating unit 33 holds, at holding unit (not illustrated), a rule location Table generated at the time of registering the rule. When there is any delete request for rule, the rule registration unit 34 specifies a rule location Table in which rules of rule IDs specified from an application are described to delete respective rules described in the rule location Table from the processing server which holds those rules.

Next, the operation of the event processing system according to the first exemplary embodiment will be described by using a more practical example. In this example, as illustrated in FIG. 7, to a front-end NW "shop A-NW", there are connected a front-end processing server 10", shop A processing server", and devices, a "shop A stock management server" and an "employee 001 mobile terminal". Moreover, to a front-end NW "DC1-NW (DC: Distribution Center)", a front-end processing server 10 "DC1 processing server" is connected, and "DC1 stock management server" is connected as a device. To the back-end network, there are connected a back-end processing server 20, a rule distribution server 30, and an application server.

An event 1 and an event D2 are illustrated in FIG. 8 as an example of events generated from the shop A stock management server. The events are formed by a list of pairs of an attribute and an attribute value. In this example, it is assumed that an attribute name "event kind" is a value for specifying that an event is formed from what attribute name.

An event generated from the employee 001 portable terminal is formed by attribute names illustrated in FIG. 9. Attribute values illustrated in FIG. 9 are taken as an example. An event generated from the DC1 stock management server is formed by attribute names illustrated in FIG. 10. Attribute values illustrated in FIG. 10 are taken as an attribute value.

The rule is formed by an ID of the rule (rule ID), and the condition for event to be processed (composite event condition), and a processing content with respect to the event that matches the composite event condition (action). The composite event condition for rules exemplified in FIG. 11 indicates that an event which matches the event condition 11, and an event which matches the event condition 12 are generated within one minute. Herein, the fact that the events generated within one minute are caused to be processed is expressed by "within". When the events which match such a condition are detected, the action is executed.

The event condition is formed by zero or more attribute name, and attribute value condition with respect to the corresponding attribute name. When each attribute value constituting the event condition matches the corresponding attribute value condition, the event matches the event condition. With respect to the event condition 11 of FIG. 11, events in which the event kind is "shop stock event", the center name is "shop A", the goods kind is "LLL", the updating time is arbitrary, the number of goods displayed in the shop is 1 or less, and the number of backyard goods of zero or more match the event condition. Thus, the event D1 of FIG. 8 matches the event condition 11.

The operation of the event processing system when the application rule illustrated in FIG. 11 is registered from an application will be described. The application rule is first input to the application rule location destination determining unit 32. For example, it is assumed that the event generating source NW Table illustrated in FIG. 13 is held by the rule distribution server 30 or any other server. Because the event condition 11 is included in the event condition in the first line of the event generating source NW solution Table, and the event condition 12 is included in the event condition of the third line, the event condition-NWID Table illustrated in FIG. 14 is generated. Next, because all NWIDs of the event condition-NWID Table-illustrated in FIG. 14 are the ID of the same front-end NW, the rule generating unit 33 generates the rule location Table illustrated in FIG. 15.

Finally, the rule registration unit 34 registers the rule 1 into the processing server disposed on the shop A-NW by using the rule relocation Table illustrated in FIG. 15.

Flow of the processing when any event is generated after the rule 1 is registered will now be described.

First, it is assumed that the employee 001 portable terminal generates an employee position event illustrated in FIG. 9 at 12:30:00 on a certain day, and transmits the event to the shop A processing server. The shop A processing server which has received the event determines that the received event matches the event condition 12 constituting the rule 1.

Thereafter, it is assumed that the shop A stock management server generates a shop stock event D1 illustrated in FIG. 8 and transmits the event to the shop A processing server. The shop A processing server which has received the event determines that the received event matches the event condition 12 constituting the rule 1, and determined that it matches the composite event condition because employee position event which matches the event condition 12 is generated within one minute. When it is determined that the event matches the composite event condition of the rule 1, the shop A processing server subsequently executes the action of the rule 1. In the action of the rule 1, a supplemental instruction message is transmitted to the portable terminal of employee of employee ID "011".

The operation of the event processing system when the application rule illustrated in FIG. 12 is registered from an application will now be described. The application rule is first input to the application rule location destination determining unit 32. For example, assuming that the event generating source NW solution Table illustrated in FIG. 13 is held by the rule distribution server 30 or any other server, the event condition 21 is included in the event condition of the first line of the event generating source NW solution Table, and the event condition 22 is included in the event condition of the second line. Consequently, the event condition NWID Table illustrated in FIG. 16 is generated.

Since the NWIDs in the event condition NWID Table illustrated in FIG. 16 are not an ID of the same front-end NW, the rule generating unit 33 subsequently generates the rule resolution Table illustrated in FIG. 17.

Finally, the rule registering unit 34 registers respective rules of the rule location Table illustrated in FIG. 17 into the processing server disposed at NWID corresponding thereto.

Flow of the processing when any event is generated after the rule 2 has been registered will now be described.

It is first assumed that the DC1 stock management server generates a DC stock event illustrated in FIG. 10 at 16:25:00 on a certain day to transmit the event to the DC1 processing server. The DC1 processing server which has received that event determines that the received event matches the composite event condition of the rule 2-2, and notifies the received event to the back-end processing server. The back-end processing server which has received the event determines that it matches the event condition 22 constituting the rule 2.

Thereafter, it is assumed that the shop A stock management server generates the shop stock event D2 illustrated in FIG. 8 at 16:30:00 on the same day to transmit the event to the shop A processing server. Then, the shop A processing server which has received the event, determines that the received event matches the composite event condition of the rule 2-1 and notify the received event to the back-end processing server. The back-end processing server which has received the event, determines that it matches the event condition 21 constituting the rule 2, and determines that it matches the composite event condition of the rule 2 because there is generated the DC stock event which matches the event condition 22 within 10 min. After determining that the event matches the composite event condition of the rule 2, the back-end processing server transmits, a resending request message to the DC1 stock management server of NW-DC 1.

As described above, according to this exemplary embodiment, the processing based on the application rule is performed by means of the front-end processing server in place of the back-end processing server, thereby making it possible to reduce the number of events flowing from the front-end NW to the back-end NW. For example, since the application rule 1 illustrated in FIG. 11 is registered into the shop A-NW, there is no possibility that events which should be monitored in order to execute the rule 1 may be notified to the back-end NW. Thus, the number of events flowing from the front-end NW to the back-end NW can be reduced.

Second Exemplary Embodiment

In the second preferred embodiment, an event processing system suitable when the performance of the front-end processing server 10 is lower than the performance of the back-end processing server 20, particularly when the memory capacity is small, will be described.

Figure 18:
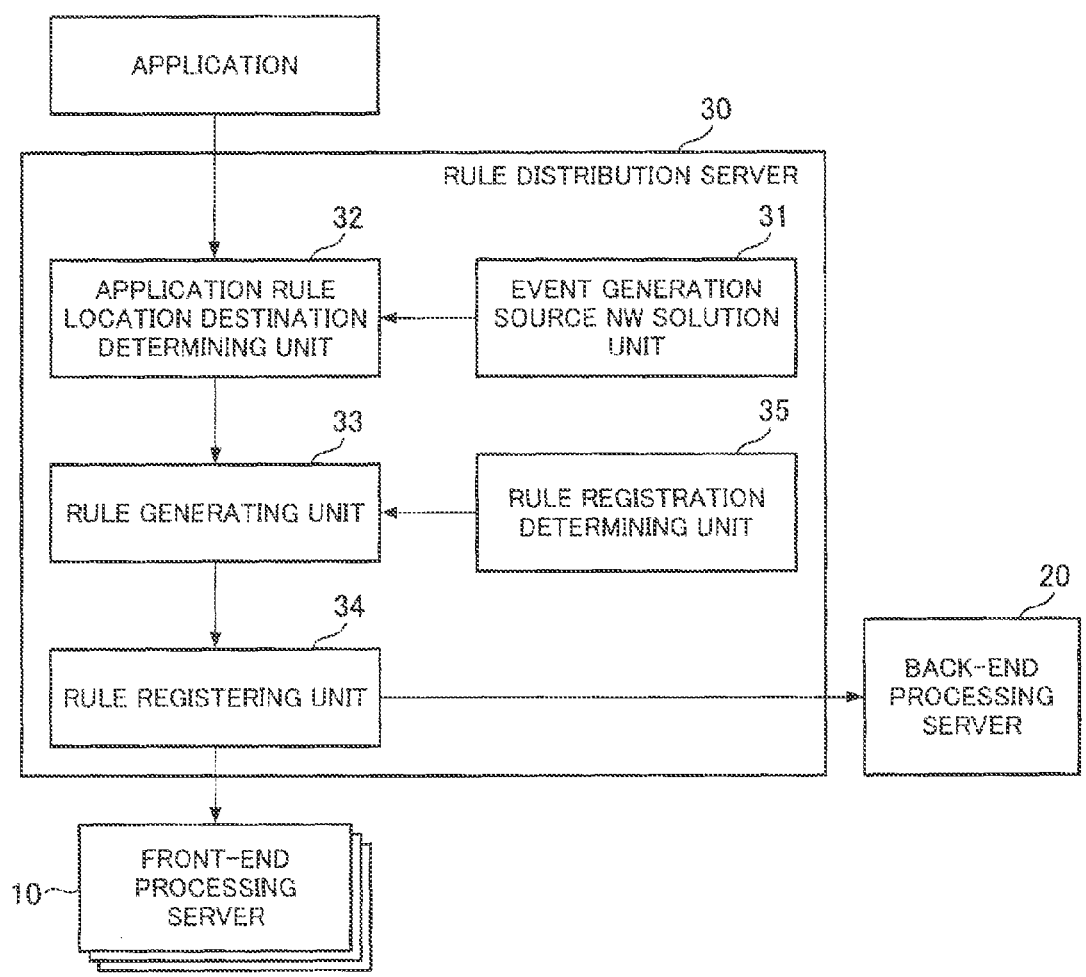
FIG. 18 is a diagram illustrating the configuration of a rule distribution server in a second exemplary embodiment.

The configuration of the event processing system according to the second exemplary embodiment is substantially the same as that of the first exemplary embodiment except that the rule distribution server 30 further includes a rule registration determining unit 35. The configuration of the rule distribution server 30 in this exemplary embodiment is illustrated in FIG. 18. The rule registration determining unit 35 determines whether or not the application rule can be registered into the front-end processing server.

The operation of the event processing system according to the second exemplary embodiment will be described by mainly taking the differences with respect to the first preferred exemplary embodiment.

Even when events which match event conditions of the application rule are all generated at the same front-end NW, there happen to generate the case that the rule registration determining unit 35 determines that registration into the front-end NW of the application rule is not permitted. This causes the rule generating unit 33 of the rule distribution server 30 to generate a rule location Table so as to register the application rule into the back-end processing server.

Figure 19:
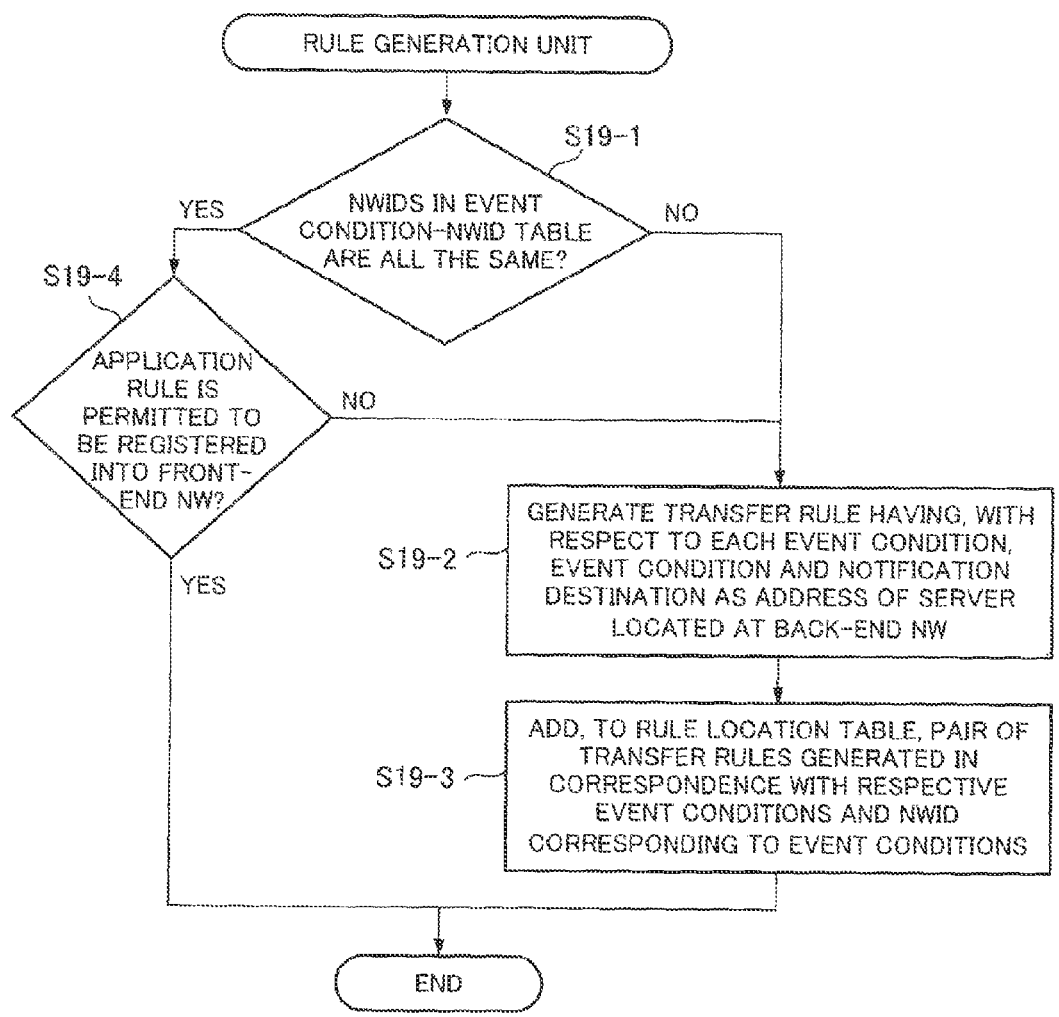
FIG. 19 is a flowchart for explaining the operation of a rule generating unit of the first exemplary embodiment.

More specifically, while when there results YES in the process of the step S5-1 of FIG. 5, the processing is terminated in the first exemplary embodiment, while step S19-4 is executed as illustrated in the flowchart of FIG. 19 in the second exemplary embodiment. In the step S19-4, the following processing is determined by a registration determination result calculated by the rule registration determining unit 35. If the application rule can be registered into the front-end NW, processing ends, while when otherwise, the step S19-2 is executed.

Prior to the description of the rule registration determining unit 35, a time window will now be described. The time window indicates time constraint for an event to be processed. If the time window is one minute, events generated within one minute are to be processed. In regard to the notation of the time window, when, e.g., the time window is one minute, it is described as "within 1 min".

Time windows are classified into two window types of sliding window and the fixed window. The sliding window refers to such a time window to execute processing with respect to events generated within past within time from a time at which an event is received (because the time width is slid every time events are generated, such window is called sliding). The fixed window refers to such a time window to execute processing with respect to events generated for a fixed time period (e.g., within March, 2012).

There are instances where whether the window is the sliding window or the fixed window may be obscure depending upon description of the rule. For example, it is assumed that such a condition "aggregation within t2 every t1" to implement statistical processing to an event generated within past t2 time every t1 time may be described in the composite event condition. This may be considered that a plurality of fixed windows exist, or may be considered as the sliding window. In this case, if, e.g., t2/t1 is a predetermined value or more, such a window type may be considered as the sliding window, otherwise, such a window type may be considered as the fixed window.

Figure 20:
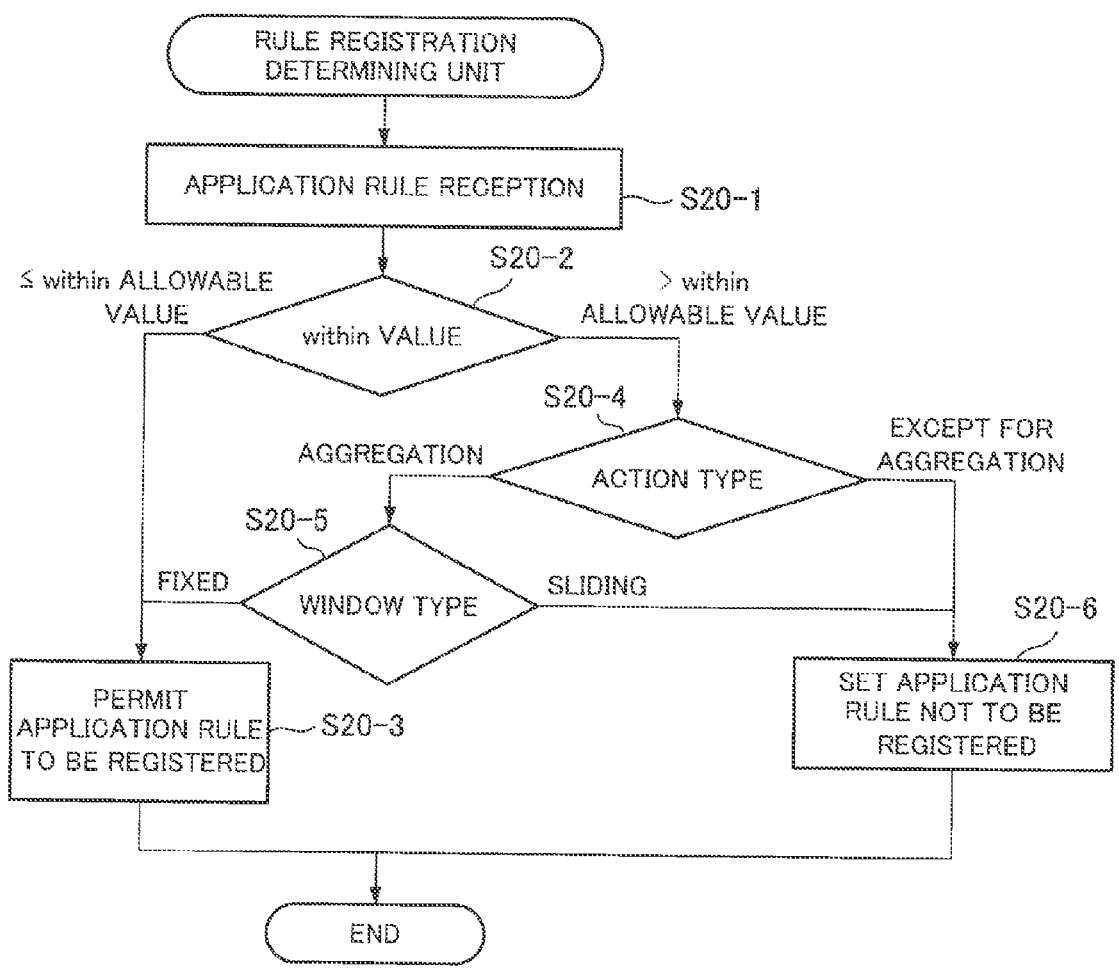
FIG. 20 is a flowchart for explaining the operation of a rule registration determining unit of a second exemplary embodiment.

As illustrated in the flowchart of FIG. 20, when the rule registration determining unit 35 receives the application rule (S20-1), it determines whether or not the received application rule can be registered into the front-end processing server 10. The rule registration determining unit 35 determines whether or not the value of within of the received application rule is equal to or less than a within allowed value given in advance (S20-2). When the value is equal to or less than the allowed value, the rule registration determining unit 35 determines that the application rule can be registered (S20-3). When the value is not equal to or less than the within allowed value, the rule registration determining unit 35 verifies whether or not the action type is aggregation (S20-4). The aggregation refers to statistical processing such as count of the number of generated events matching a predetermined event condition, calculation of total value of specific attribute values, and/or calculation of average value thereof. When the action type is aggregation, and when the window type is the fixed one (S20-5), the rule registration determination unit 35 determines that the application rule can be registered (S20-3). When the action type is not aggregation, the rule registration determining unit 35 determines that the application rule is not allowed to be registered (S20-6). When the action type is aggregation (S20-4) and the window type is the sliding one (S20-5), the rule registration determining unit 35 determines that the application rule is not allowed to be registered (S20-6).

The registration into the front-end processing server 10 is permitted when the value of within designated by the application rule is small in the determination process for determining whether or not the registration is possible, This is because the size of state held with respect to the application rule comes to be small when the value of within is small. The state refers to information indicating the state as to whether or not an event received in the past in executing the application rule matches what event condition. When the within increases, the number of events to be processed increases. Thus, the size of the state also increases.

Moreover, while whether or not the application rule can be registered into the front-end processing server 10 is determined on the basis of only the application rule in the above-described description, such registration availability may be determined depending upon the relationship with respect to the application rule registered in advance. For example, processing loads and priorities of application rules may be calculated therefrom to select an application rule having a higher priority so that the total value of processing loads of application rules to be registered is equal to or less than the allowed load of the front-end processing server 10.

The processing load of the application rule depends upon a generation rate of events which match the event condition designated by the application rule. Thus, a load value with respect to the application rule may be recalculated on the basis of the generation rate. When a total value of load values of the application rules exceeds the allowed load of the front-end processing server 10, an application rule having a lower priority may be transferred from the front-end processing server 10 to the back-end processing server 20.

As described above, the second exemplary embodiment can reduce the number of events flowing from the front-end NW to the back-end NW while the front-end processing server 10 is controlled not to act as a bottleneck. The reason is that when the performance of the front-end processing server 10 is low, a processing rule having heavy load is disposed at the back-end processing server 20.

Third Exemplary Embodiment

Figure 21:
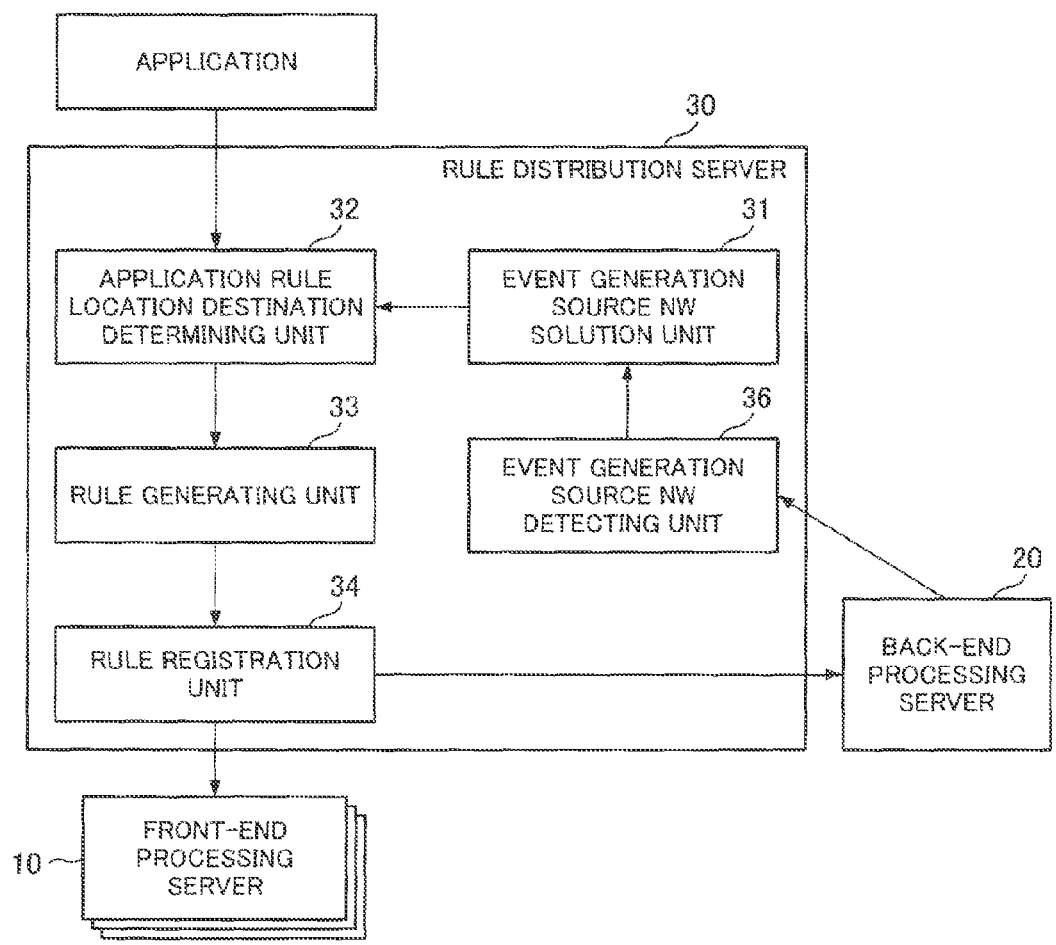
FIG. 21 is a diagram illustrating the configuration of a rule distribution server in a third exemplary embodiment.

In the third exemplary embodiment, components to generate an event generating source NW solution Table will be described. The configuration of the event processing system according to the third exemplary embodiment is substantially the same as that of the first exemplary embodiment except that the rule distribution server 30 further includes an event generating source NW detecting unit 36. The configuration of the rule distribution server 30 in this exemplary embodiment is illustrated in FIG. 21. The event generating source NW detecting unit 36 generates the event generating source NW solution Table from an event received by the back-end processing server 20.

The operation of the event processing system according to the third exemplary embodiment will be described by mainly taking the differences with respect to the first exemplary embodiment.

The event generating source NW detecting unit 36 of the rule distribution server 30 receives information of event that the back-end processing server 20 receives, and calculates that an event matching what event condition is generated at which front-end NW. A pair of the calculated condition and front-end NWID is added to the event generating source NW solution Table.

Figure 22:
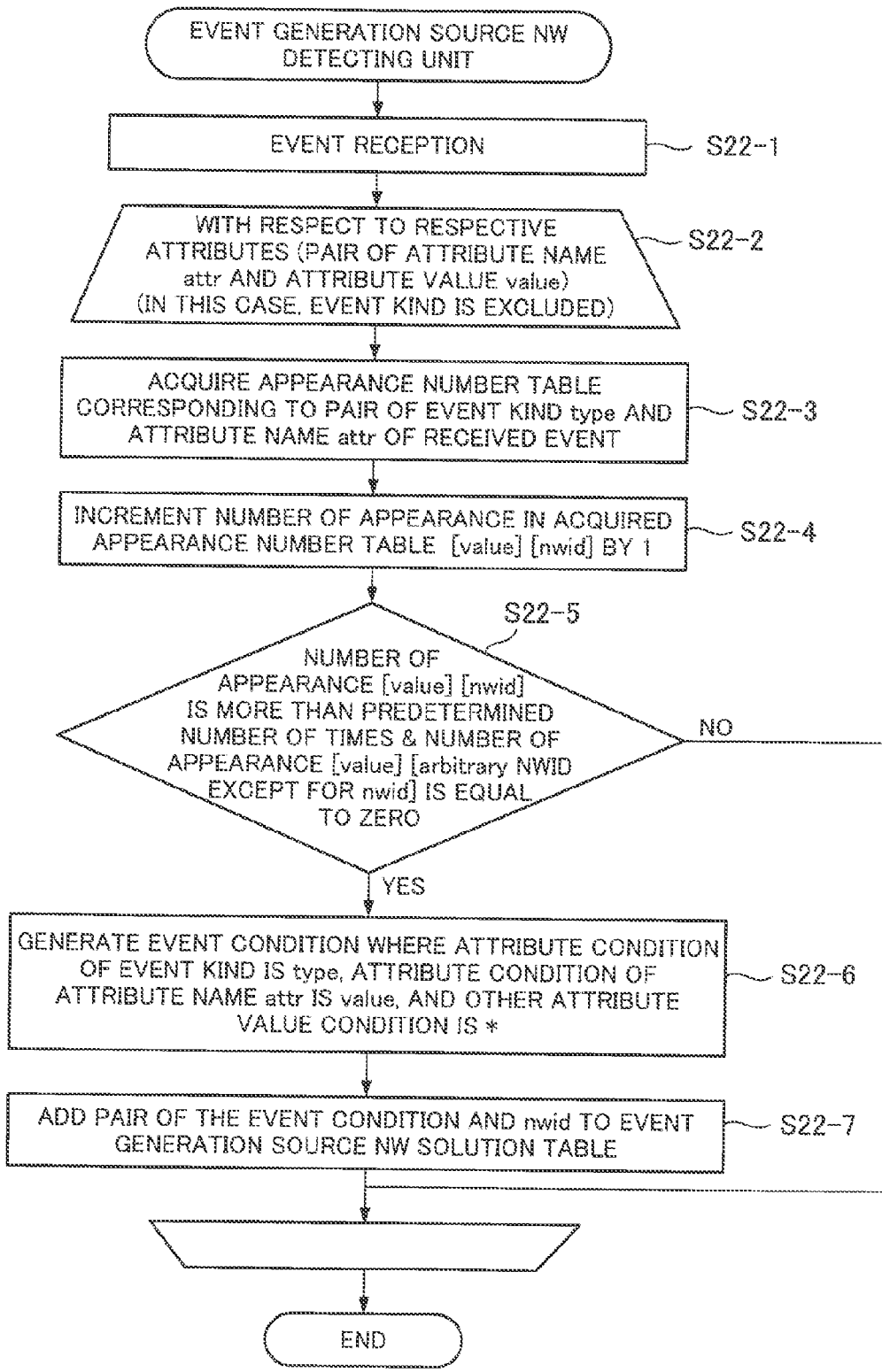
FIG. 22 is a diagram illustrating the configuration of an event generating source NW detecting unit in the third exemplary embodiment.

More specifically, as illustrated in the flowchart of FIG. 22, when the event generating source NW detecting unit 36 receives an event, the event generating source NW detecting unit 36 performs the following processing to respective attributes (pair of an attribute name, attr and an attribute value, value) constituting the event. It is to be noted that since an event kind is an attribute for specifying that the event is formed by what attribute name, it is excluded from attributes to be processed. Next, an appearance number Table corresponding to a pair of event kind type and attribute name attr of the received event is acquired. As illustrated in FIG. 23, the appearance number Table is a table indicating how many times respective attribute values are generated at respective front-end NWs. Next, the number of appearance [value][nwid] in the appearance number Table is incremented by 1. Specifically, nwid is an ID of a NW which is the generation source of the event, and the number of appearance [value] [nwid] is a value determined by a row specified by value and a column specified by nwid in the appearance number Table. Next, there is determined whether or not the number of appearance [value][nwid] is a predetermined number or more and the appearance number [value] [arbitrary NWID except for nwid] is equal to zero. In that case, an event condition where the attribute value condition of the event kind is set to type, the attribute value condition of the attribute name attr is set to value, and the attribute value condition except therefor is set to * (an arbitrary value) is generated to add a pair of the event condition and nwid to the event generating source NW solution Table.

While one appearance number Table is employed with respect to one attribute name as described above, a single appearance number Table may be generated with respect to the combination of two or more attribute names. A power set with respect to a set of attribute names constituting the event may be generated to generate appearance number Tables for every respective elements of the power set. In that case, a value for specifying the row corresponds to a tuple of an attribute value which is elements of the power set. An event condition to be generated corresponds to an attribute value condition with respect to corresponding attribute names having respective attribute values constituting the tuple.

For example, in the example illustrated in FIG. 23, when the threshold value as to whether or not the event condition is to be generated on the basis of the appearance number Table having the event kind "employee position" and the attribute name "employee ID" is 5 (five), from the first line, the first line of FIG. 24 is generated, and from the second line, the second line of FIG. 24 is generated.

As described above, since the event generation source NW solution Table is automatically generated from events generated in the third exemplary embodiment, labor for manually preparing the event generating source NW solution Table can be reduced.

Fourth Exemplary Embodiment

The fourth exemplary embodiment includes a component for updating locations of the rules when a device is moved. The fourth exemplary embodiment will now be described.

Figure 25:
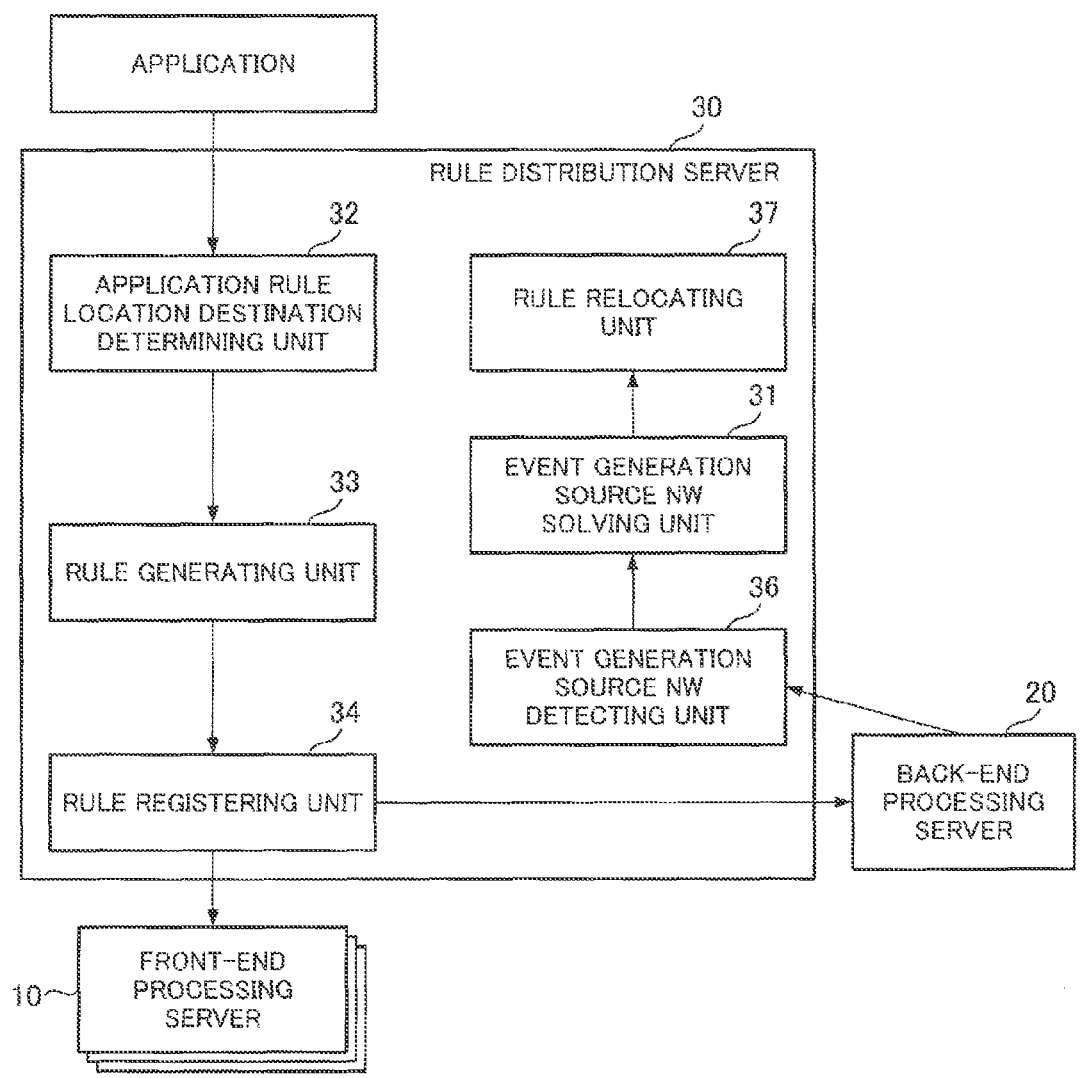
FIG. 25 is a diagram illustrating the configuration of a rule distribution server in a third exemplary embodiment.

The configuration of an event processing system according to the fourth exemplary embodiment is substantially the same as that of the third exemplary embodiment except that the rule distribution server 30 further includes a rule relocation unit. The configuration of the rule distribution server 30 in this exemplary embodiment is illustrated in FIG. 25. The rule relocation unit performs the relocation of rules on the basis of change of the event generating source NW solution Table.

The operation of the event processing system according to the fourth exemplary embodiment will be described mainly by taking the differences with respect to the third exemplary embodiment.

When the rule generating unit 33 of the rule distribution server 30 registers an application rule into the front-end processing server 10, it generates a transfer rule to transfer an event necessary for processing of the application rule to the front-end processing server, in order to register it into a front-end processing server except for the front-end processing server. Thus, even if an event necessary for processing of the application rule is generated at any front-end NW, the event arrives at a front-end processing server where the application rule is registered.

Figure 26:
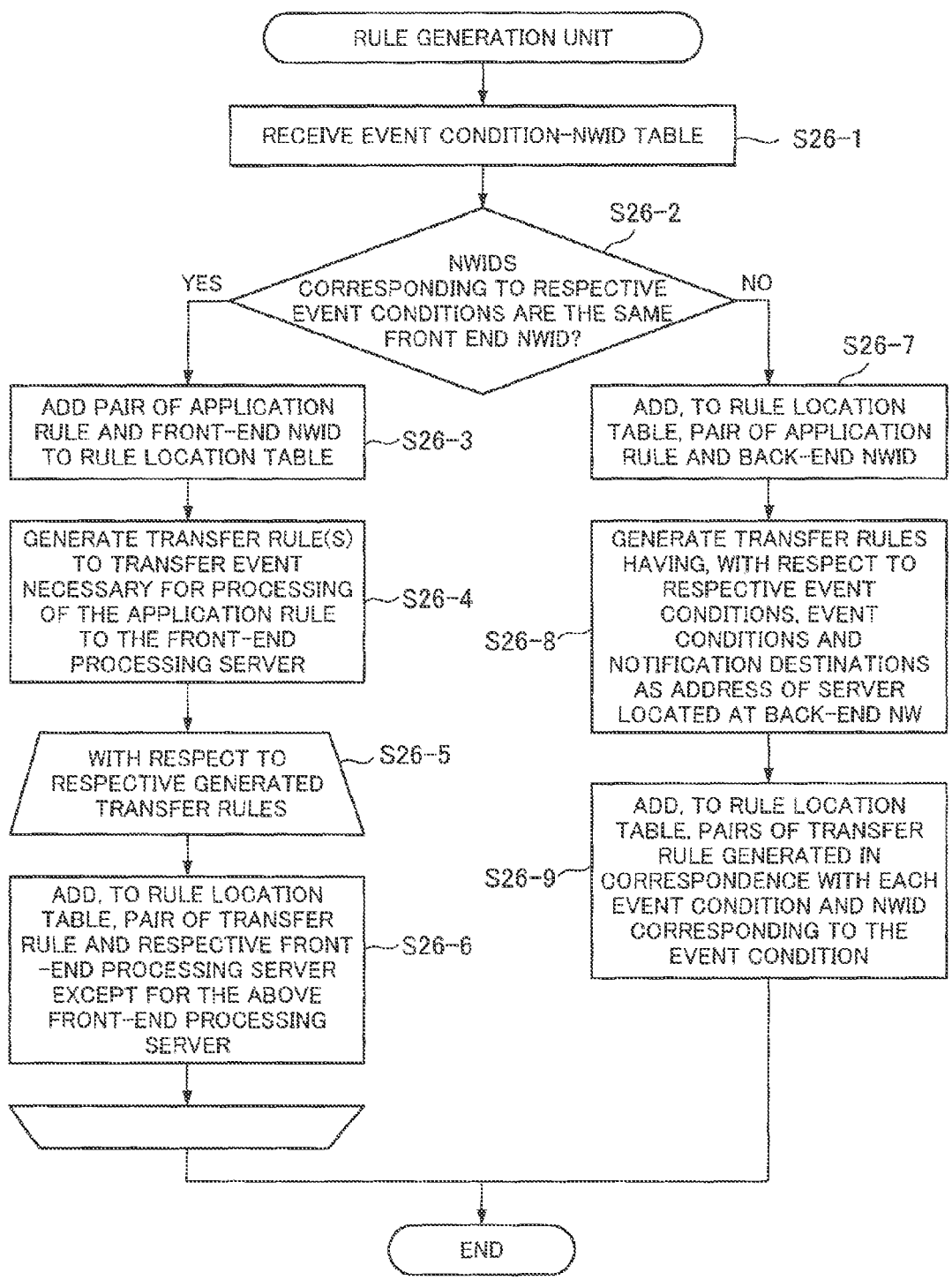
FIG. 26 is a flowchart for explaining the operation of a rule generating unit in the fourth exemplary embodiment.

More specifically, as illustrated in the flowchart of FIG. 26, after step S2-3 (add a pair of application rule and front-end NWID to the rule relocation Table), step S26-4 (generates transfer rules for transferring an event to a processing server necessary for processing the event), step S26-5 and step S26-6 (add, with respect to the generated transfer rule, to the rule relocation Table, pairs of transfer rules and respective front-end processing servers except for the front-end processing servers) are executed.

Figure 27:
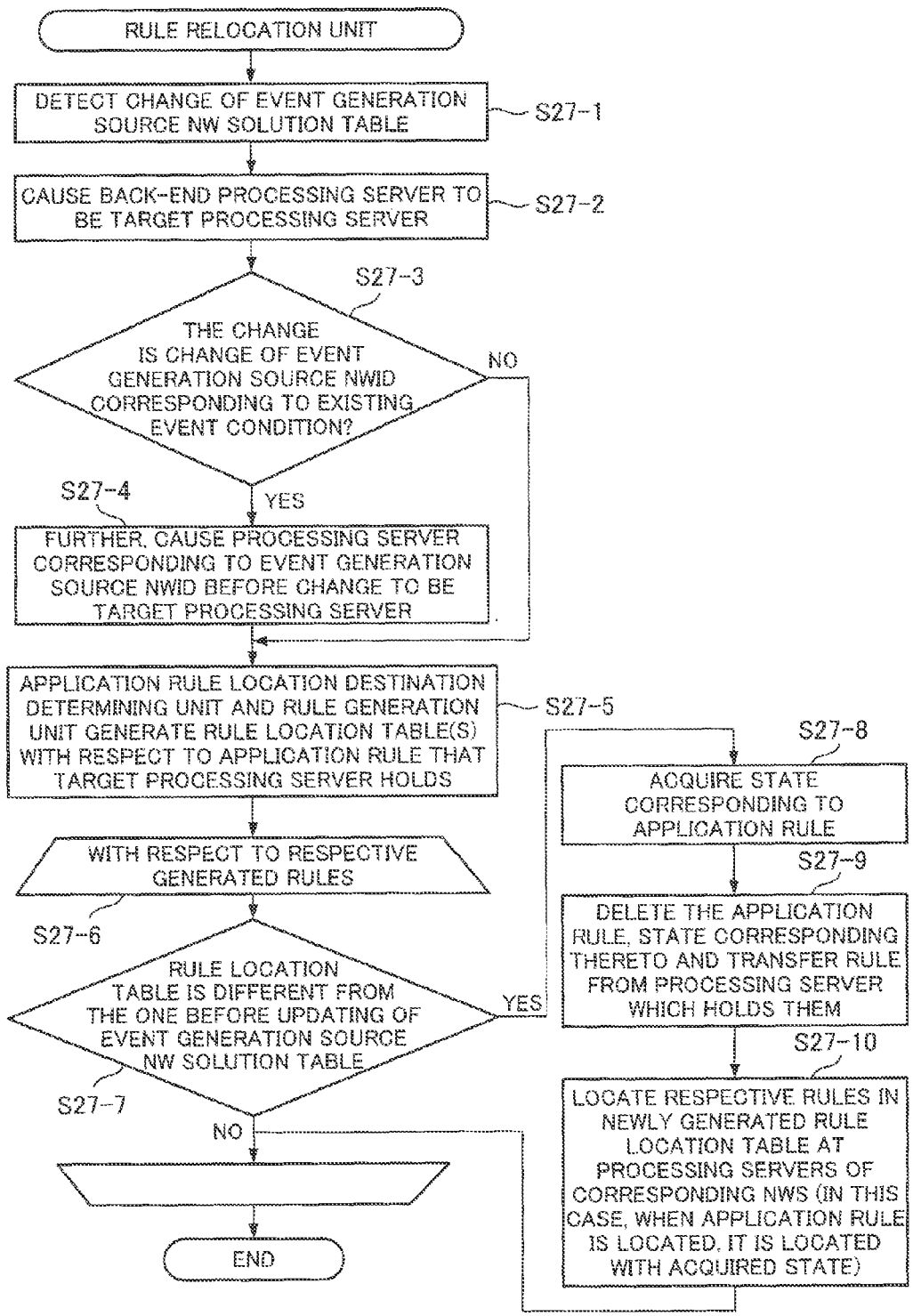
FIG. 27 is a flowchart for explaining the operation of a rule relocation unit in the fourth exemplary embodiment.

When the event generating source NW solution Table is changed (S27-1) as illustrated in the flowchart of FIG. 27, the rule relocation unit 37 of the rule distribution server 30 causes an application rule that the back-end processing server 10 holds to be relocated. Hereinafter, the processing server holding the rules to be relocated is called a target processing server (S27-2). When such a change is a change of an event generating source NWID corresponding to the existing event condition (S27-3), a processing server corresponding to the event generating source NWID before change is caused to be the target processing server (S27-4).

The change of the event generating source NW solution Table is classified into either an addition of a new event condition or a change of event generating source NWID corresponding to the existing event condition. The rule relocation unit 37 discriminates the change is either one of changes, whereby when the new event is added, the application rule which an event condition included in the newly added event condition is designated is not registered except for the back-end processing server. For this reason, the application rule registered in the back-end processing server is determined to be a candidate for relocation. On the other hand, when such a change is a change of an event generating source NWID corresponding to the existing event condition, the application rule where the event condition included in the event condition is designated is registered at either one of the front-end processing server and the back-end processing server corresponding to the event generating source NWID before change. For this reason, the application rules registered in the front-end processing server and the back-end processing server are determined to be candidates for relocation (S27-4).

The application rule location destination determining unit 32 and the rule generating unit 33 generate rule relocation Tables with respect to the application rule that the target processing server holds (S27-5). When such a rule relocation Table is different from the one before updating the generation source NW solution Table (S27-7), the rule resolution unit 37 performs the relocation of rules.

In the relocation of rules, the rule relocation unit 37 first acquires data on a state corresponding to the application rule (S27-8). Next, the rule relocation unit 37 deletes the application rule, the state corresponding thereto and a transfer rule from the processing server holding them (S27-9). Thereafter, the rule relocation unit 37 locates respective rules in the rule location Table newly generated at a processing server of a corresponding NW (S27-10). When locating the application rules, the rule relocation unit 37 locates the rules with the acquired state. Since the state is located together to continue the processing status at a time point of deleting processing rules to execute event processing, it is possible to prevent mismatch of event with respect to the composite event condition.

While the event generating source detecting unit 36 generates an appearance number Table, such appearance number Table is generated with events generated within a certain period in the past. The reason thereof is that when any device is moved, an event generating source NW before the movement is not effective for generation of the event generating source NW solution Table.

Moreover, when the event generating source NW detecting unit 36 adds a pair of the event condition and NWID in step S22-7 of FIG. 22, if the same condition as the event condition to be added is already registered in the event generating source solution Table, the event generating source NW detecting unit 36 overwrites NWID in the row by a new NWID.

Figures 28, 29:
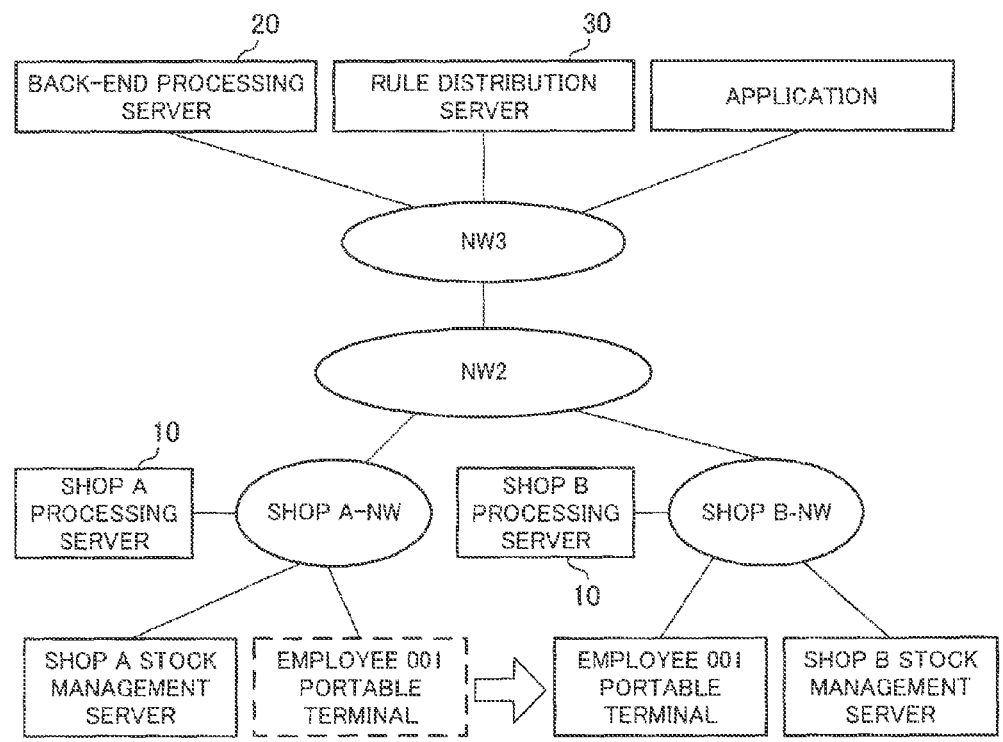
FIG. 28 is a diagram for explaining, by using a more practical example, the operation of an event processing system according to the fourth exemplary embodiment.
FIG. 29 is a diagram illustrating appearance number Table.

The operation of the event processing system according to this exemplary embodiment will now be described by using a more practical example. For example, as illustrated in FIG. 28, it is assumed that the employee 001 portable terminal is moved from the shop A-NW to the shop B-NW. Thus, an event where the employee ID is 001 would be generated from the shop B-NW so that the appearance number Table having values as illustrated in FIG. 23 is revised into a table, for example, having values as illustrated in FIG. 29. Followed by this, in the generation source NW solution Table, values illustrated on the first line of FIG. 24 are revised into values illustrated in FIG. 31. A rule location Table as illustrated in FIG. 30 is generated on the basis of changes of the event generating source NW solution Table, and is located at respective processing servers.

As described above, according to the fourth exemplary embodiment, when application rules are registered into the front-end processing server, even if an event is generated at any front-end NW, the event necessary for processing the application rule may not flow into the back-end processing server. For this reason, also when a network to which a device is connected is changed, it is possible to maintain the state where the number of events flowing from the front-end NW to the back-end NW is reduced. In addition, when a network to which a device is connected is changed, the application rules are relocated, thereby making it possible to reduce the number of events flowing between the front-end NWs.

The communication rule distribution server, the front-end processing server and the back-end processing server according to the exemplary embodiments of the present invention as described above may be realized by reading out an operation program, etc. stored in a memory or storage unit by a CPU (Central Processing Unit) and executing the program, or may be constituted by hardware. Only a part of functions of the above-described exemplary embodiments may be realized by a computer program.

While the present invention has been described by taking preferred exemplary embodiments as described above, the present invention is not necessarily limited to the above-described exemplary embodiments, but may be variously modified or changed and implemented within the scope of the technical idea.

A portion or the entirety of the above-described exemplary embodiments may be described as in the following supplementary notes.

(Supplementary note 1) A rule distribution server operative to locate, on registering rules relating to event processing from an application server, rules at a front-end processing server connected to a front-end network to which an event generating source is connected and a back-end processing server connected to a back-end network, the rule distribution server including:

an event generating source network solving unit which calculates, from an event condition, ID of a front-end network where any event matching the event condition is generated;

an application rule location destination determining unit such that when events matching respective event conditions designated by application rules registered from application are all generated on the same front-end network, the application rule location destination determining unit registers the application rule into a processing server connected to the front-end network, while when the events are not generated, the application rule location destination determining unit registers the application rule into the back-end processing server;

a rule generating unit operative to generate such a processing rule to transfer an event matching the event condition to a back-end processing server, with a front-end processing server where the event matching the event condition is generated being as a registration destination every the event conditions with respect to an application rule which has been determined so that the rule is to be registered into the back-end processing server; and a rule registering unit operative to respectively register an application rule and a transfer rule generated at the rule generating unit into corresponding processing servers.

(Supplementary note 2) The rule distribution server according to Supplementary note 1, further including:

a rule registration determining unit which determines, from the content of an application rule, whether or not a processing rule can be registered into the front-end processing server, wherein the rule generating unit is such that when it is determined at the rule registration determining unit that an application rule is registerable, and when all events matching respective event conditions are generated on the same front-end network, the rule generating unit registers the application rule into the front-end network.

(Supplementary note 3) The rule distribution server according to Supplementary note 2, wherein the rule generating unit is such that:

when a time width t is specified for a time period during which any event generated is caused to be subject to processing, if the time width is less than a predetermined value, the rule generating unit permits the application rule to be registered into the front-end processing server;

when the time width is not less than the predetermined value, the rule generating unit determines whether or not there is such a processing to calculate statistical values of a plurality of events, while when there is no processing to calculate statistical values, the rule generating unit does not permit the application rule permitted to be registered; and when there is such a processing to calculate statistical values, the rule generating unit determines, with respect to respective events generated from a device or devices, whether or not a processing designated by the application rule is a sliding window processing to implement a processing to any event generated during a past time width t from a time point at which each of the events is generated, or a fixed window processing to implement a processing to events generated during a time width t from a predetermined time point irrespective of a generation time of the event, whereby when such a processing designated by the application rule is the fixed window processing, the rule generating unit permits the application rule to be registered, while when such a processing is the sliding window processing, the rule generating unit does not permit the application rule to be registered.

(Supplementary note 4) The rule distribution server according to any one of Supplementary notes 1 to 3, further including:

an event generating source network detecting unit operative to acquire information of an event that a back-end processing server has received thus to generate an event generating source network solution Table, wherein the event generating source network detecting unit is such that when attribute values corresponding to respective elements of a power aggregation of an aggregation of attributes, and received events are in correspondence with all attribute values of those elements, the event generating source network detecting unit increments, by one (1), a count value specified by the element and ID of the generation source network of each of the events, whereby when count values specified by the elements and IDs of the networks except for the ID of the generation source network are equal to zero with respect to a count value specified by the element and the ID of the generation source network of the event, event generating source network detecting unit generates an event condition where an attribute value condition is caused to be the element, which is a predetermined number or more, and an attribute value condition or conditions except therefor is or are caused to be an arbitrary value to add a pair of the generated event condition and the generation source network ID to an event generating source network solution Table.

(Supplementary note 5) The rule distribution server according to any one of Supplementary notes 1 to 4, wherein the rule generating unit is such that when registering an application rule into the front-end processing server, the rule generating unit generates a transfer rule to transfer, to the front-end processing server, an event necessary for processing of the application rule to register the transfer rule thus generated into a front-end processing server or servers except for the front-end processing server.

(Supplementary note 6) The rule distribution server according to Supplementary note 5, further including:

a rule relocation unit which performs relocation of rules on the basis of a change of the event generating source network solution Table, wherein the rule relocation unit is such that when the event generating source network solution Table is changed, the rule relocation unit causes the back-end processing server to be a target processing server, while when such a change is a change of an event generating source network ID corresponding to the existing event condition, the rule relocation unit further causes a processing server corresponding to an event generating source network ID before change to be a target processing server, wherein the application rule location destination determining unit and the rule generating unit perform, with respect to an application rule that the target processing server holds, generation of an transfer rule and calculation of location destination of the application rule, and wherein the rule relocation unit is such that when the calculated result is different from a content before updating of the event generating source network solution Table, the rule relocation unit acquires a state with respect to the application rule from a processing server in which the application rule is registered, to delete the application rule, a state with respect to thereto and the transfer rule from a processing server which holds them, to locate a rule of a newly generated rule location table at a processing server of the corresponding network and to locate the rule along with state acquired in the location of the application rule.

(Supplementary note 7) An event processing system including:

a front-end processing server connected to a front-end network to which an event generating source is connected;

a back-end processing server operative to process events collected from processing servers of respective front-end networks; and a rule distribution server operative to generate, from application rules registered from an application into respective processing servers to locate the application rules and the generated transfer rules at the processing servers, wherein the rule distribution server includes:

an event generating source network solving unit operative to calculate, from an event condition, ID of the front-end network where any event matching the event condition is generated;

an application rule location destination determining unit such that when events matching the respective event conditions designated by the application rule are all generated on the same front-end network, the application rule location destination determining unit registers the application rule into the front-end network, while when otherwise, the application rule location destination determining unit that the application rule is registered into the back-end processing server;

a rule generating unit operative to generate a processing rule to transfer, with respect to an application rule determined so that the rule is registered into the back-end processing server, an event matching the event condition to the back-end processing server with a processing server or servers connected to the front-end network where events matching the event condition are generated for each event condition being as a registration destination or destinations; and a rule registering unit operative to register, into the processing server, the application rule and the transfer rule generated at the rule generating unit.

(Supplementary note 8) A rule distribution method of locating, on registering a rule relating to an event processing from an application server, the rule at a front-end processing server connected to a front-end network to which an event generating source is connected and a back-end processing server connected to a back-end network, the rule distribution method including:

calculating, from an event condition, ID of a front-end network where any event matching the event condition is generated;

making a determination such that when events matching respective event conditions designated by application rules registered from an application are all generated on the same front-end network, the application rule is registered into a processing server connected to the front-end network, while when the events are not generated, the application rule is registered into the back-end processing server;

generating such a processing rule to transfer, to the back-end processing server, any event matching the event condition with a front-end processing server where any event matching the event conditions is generated being as a registration destination for each event condition with respect to an application rule which has been determined so that the rule is registered into the back-end processing server, and respectively registering the generated transfer rules into the corresponding processing servers.

(Supplementary note 9) The rule distribution method according to Supplementary note 8, further including:

determining, from the content of an application rule, whether or not a processing rule can be registered into the front-end processing server, when it is determined that an application rule is registerable, and when all events matching respective event conditions are generated on the same front-end network, registering the application rule into the front-end network.

(Supplementary note 10) The rule distribution method according to Supplementary note 9, wherein when a time width t is specified for a time period during which any event generated is caused to be subject to processing, if the time width is less than a predetermined value, permitting the application rule to be registered into the front-end processing server;

when the time width is not less than the predetermined value, determining whether or not there is such a processing to calculate statistical values of a plurality of events, while when there is no processing to calculate statistical values, not permitting the application rule permitted to be registered; and when there is such a processing to calculate statistical values, determining, with respect to respective events generated from a device or devices, whether or not a processing designated by the application rule is a sliding window processing to implement a processing to any event generated during a past time width t from a time point at which each of the events is generated, or a fixed window processing to implement a processing to events generated during a time width t from a predetermined time point irrespective of a generation time of the event, whereby when such a processing designated by the application rule is the fixed window processing, permitting the application rule to be registered, while when such a processing is the sliding window processing, not permitting the application rule to be registered.

(Supplementary note 11) The rule distribution method according to any one of Supplementary notes 8 to 10, further including:

operatizing to acquire information of an event that a back-end processing server has received thus to generate an event generating source network solution Table, wherein when attribute values corresponding to respective elements of a power aggregation of an aggregation of attributes, and received events are in correspondence with all attribute values of those elements, incrementing, by one (1), a count value specified by the element and ID of the generation source network of each of the events, whereby when count values specified by the elements and IDs of the networks except for the ID of the generation source network are equal to zero with respect to a count value specified by the element and the ID of the generation source network of the event, and generating an event condition where an attribute value condition is caused to be the element, which is a predetermined number or more, and an attribute value condition or conditions except therefor is or are caused to be an arbitrary value to add a pair of the generated event condition and the generation source network ID to an event generating source network solution Table.

(Supplementary note 12) The rule distribution method according to any one of Supplementary notes 8 to 11, wherein when registering an application rule into the front-end processing server, generating a transfer rule to transfer, to the front-end processing server, an event necessary for processing of the application rule, and registering the transfer rule the front-end processing servers except for the front-end processing server.

(Supplementary note 13) The rule distribution method according to Supplementary note 12, further including:

performing relocation of rules on the basis of a change of the event generating source network solution Table, wherein when the event generating source network solution Table is changed, causing the back-end processing server to be a target processing server, while when such a change is a change of an event generating source network ID corresponding to the existing event condition, further causing a processing server corresponding to an event generating source network ID before change to be a target processing server, performing, with respect to an application rule that the target processing server holds, generation of an transfer rule and calculation of location destination of the application rule, and when the calculated result is different from a content before updating of the event generating source network solution Table, acquiring a state with respect to the application rule from a processing server in which the application rule is registered, to delete the application rule, a state with respect to thereto and the transfer rule from a processing server which holds them, to locate a rule of a newly generated rule location table at a processing server of the corresponding network and to locate the rule along with state acquired in the location of the application rule.

(Supplementary note 14) A program causing a computer connected to a front-end processing server connected to a front-end network to which an event generating source is connected, and a back-end processing source connected to a back-end network to execute:

a processing step of calculating, from an event condition, ID of a front-end network where any event matching the event condition is generated;

an application rule location destination determination processing step of making a determination such that when events matching respect to respective event conditions specified by an application rule registered from application are all generated on the same front-end network, the application rule is registered into a processing server connected to the front-end network, while when those events are not generated, the application rule is registered into the back-end processing server;

a rule generation processing step of generating a processing rule to transfer any event matching the event condition to the back-end processing server with the front-end processing server where the event matching the event condition is generated being as a registration destination for each event condition with respect to the application rule determined to be registered into the back-end processing server, and a rule registration processing step of respectively registering the generated transfer rule to the corresponding processing servers.

(Supplementary note 15) The program according to Supplementary note 14, further including:

a rule registration determining step of determining, from the content of an application rule, whether or not a processing rule can be registered into the front-end processing server, wherein the rule registration determining step, when it is determined that an application rule is registerable, and when all events matching respective event conditions are generated on the same front-end network, registering the application rule into the front-end network.

(Supplementary note 16) The rule distribution server according to Supplementary note 16, wherein the rule generating step is such that:

when a time width t is specified for a time period during which any event generated is caused to be subject to processing, if the time width is less than a predetermined value, the rule generating step permits the application rule to be registered into the front-end processing server;

when the time width is not less than the predetermined value, the rule generating step determines whether or not there is such a processing to calculate statistical values of a plurality of events, while when there is no processing to calculate statistical values, the rule generating step does not permit the application rule permitted to be registered; and when there is such a processing to calculate statistical values, the rule generating step determines, with respect to respective events generated from a device or devices, whether or not a processing designated by the application rule is a sliding window processing to implement a processing to any event generated during a past time width t from a time point at which each of the events is generated, or a fixed window processing to implement a processing to events generated during a time width t from a predetermined time point irrespective of a generation time of the event, whereby when such a processing designated by the application rule is the fixed window processing, the rule generating step permits the application rule to be registered, while when such a processing is the sliding window processing, the rule generating step does not permit the application rule to be registered.

(Supplementary note 17) The program according to any one of Supplementary notes 13 to 16, further including:

an event generating source network detecting step operative to acquire information of an event that a back-end processing server has received thus to generate an event generating source network solution Table, wherein the event generating source network detecting step is such that when attribute values corresponding to respective elements of a power aggregation of an aggregation of attributes, and received events are in correspondence with all attribute values of those elements, the event generating source network detecting step increments, by one (1), a count value specified by the element and ID of the generation source network of each of the events, whereby when count values specified by the elements and IDs of the networks except for the ID of the generation source network are equal to zero with respect to a count value specified by the element and the ID of the generation source network of the event, event generating source network detecting step generates an event condition where an attribute value condition is caused to be the element, which is a predetermined number or more, and an attribute value condition or conditions except therefor is or are caused to be an arbitrary value to add a pair of the generated event condition and the generation source network ID to an event generating source network solution table.

(Supplementary note 18) The program according to any one of Supplementary notes 8 to 17, wherein the rule generating step is such that when registering an application rule into the front-end processing server, generating a transfer rule to transfer, to the front-end processing server, an event necessary for processing of the application rule, and registering the transfer rule the front-end processing servers except for the front-end processing server.

(Supplementary note 19) The program according to Supplementary note 18, further including:

a rule relocation step for performing relocation of rules on the basis of a change of the event generating source network solution table, wherein the rule relocation step is such that when the event generating source network solution Table is changed, the step causes the back-end processing server to be a target processing server, while when such a change is a change of an event generating source network ID corresponding to the existing event condition, the step further causes a processing server corresponding to an event generating source network ID before change to be a target processing server, wherein the application rule location destination determining step and the rule generating step perform, with respect to an application rule that the target processing server holds, generation of an transfer rule and calculation of location destination of the application rule, and wherein the rule relocation step is such that when the calculated result is different from a content before updating of the event generating source network solution Table, the step acquires a state with respect to the application rule from a processing server in which the application rule is registered, to delete the application rule, a state with respect to thereto and the transfer rule from a processing server which holds them, to locate a rule of a newly generated rule location table at a processing server of the corresponding network and to locate the rule along with state acquired in the location of the application rule.

While the present invention has been described by taking the preferred exemplary embodiments as described above, the present invention is not necessarily limited to the abovementioned exemplary embodiments, but may be variously changed or modified and implemented within the scope of the technical idea thereof.

The present invention claims the priority with the Japanese Patent Application No. 2012-233373, filed on 23 Oct. 2012 being as basis, and is incorporated herein in the entirety of the disclosure thereof.

REFERENCE SIGNS LIST

10 Front-end processing server
20 Back-end processing server
30 Rule distribution server
31 Event generation source NW solution unit
32 Application rule location destination unit
33 Rule generating unit
34 Rule registration unit
35 Rule registration determining unit
36 Event generation source NW detecting unit
37 Rule relocation unit

The invention claimed is:

1. A rule distribution server operative to locate, on registering rules relating to event processing from an application server, rules at a front-end processing server connected to a front-end network to which an event generating source is connected and a back-end processing server connected to a back-end network, the rule distribution server comprising:
a memory storing instructions; and
at least one processor configured to process the instructions to:
calculate, from an event condition, an ID of a front-end network where any event matching the event condition is generated;
register the application rule into a processing server connected to the front-end network when events matching respective event conditions designated by application rules registered from application are all generated on the same front-end network, and register the application rule into the back-end processing server when the events are not generated on the same front-end network;
generate a processing rule to transfer an event matching the event condition to a back-end processing server, with respect to an application rule which has been determined to be registered into the back-end processing server; and
respectively register an application rule and a transfer rule into corresponding processing servers.

2. The rule distribution server according to claim 1, the at least one processor further configured to process the instructions to:

determine, from the content of an application rule, whether or not a processing rule can be registered into the front-end processing server, and
register the application rule into the front-end network when it is determined that an application rule is registerable, and when all events matching respective event conditions are generated on the same front-end network.

3. The rule distribution server according to claim 2, the at least one processor further configured to process the instructions to:
when a time width t is specified for a time period during which any event generated is caused to be subject to processing, if the time width is less than a predetermined value, the rule permit the application rule to be registered into the front-end processing server;
when the time width is not less than the predetermined value, the rule generating unit determine whether or not there is a processing to calculate statistical values of a plurality of events, while when there is no processing to calculate statistical values, do not permit the application rule permitted to be registered; and
when there is a processing to calculate statistical values, determine, with respect to respective events generated from a device or devices, whether or not a processing designated by the application rule is a sliding window processing to implement a processing to any event generated during a past time width t from a time point at which each of the events is generated, or a fixed window processing to implement a processing to events generated during a time width t from a predetermined time point irrespective of a generation time of the event, whereby when a processing designated by the application rule is the fixed window processing, permit the application rule to be registered, while when a processing is the sliding window processing, do not permit the application rule to be registered.

4. The rule distribution server according to claim 1, the at least one processor further configured to process the instructions to:
acquire information of an event that a back-end processing server has received thus to generate an event generating source network solution Table, and
when attribute values corresponding to respective elements of a power aggregation of an aggregation of attributes, and received events are in correspondence with all attribute values of those elements, increment, by one (1), a count value specified by the element and ID of the generation source network of each of the events, whereby when count values specified by the elements and IDs of the networks except for the ID of the generation source network are equal to zero with respect to a count value specified by the element and the ID of the generation source network of the event, generate an event condition where an attribute value condition is caused to be the element, which is a predetermined number or more, and an attribute value condition or conditions except therefor is or are caused to be an arbitrary value to add a pair of the generated event condition and the generation source network ID to an event generating source network solution Table.

5. The rule distribution server according to claim 1, the at least one processor further configured to process the instructions to:
when registering an application rule into the front-end processing server, generate a transfer rule to transfer, to the front-end processing server, an event necessary for processing of the application rule to register the transfer rule thus generated into a front-end processing server or servers except for the front-end processing server.

6. The rule distribution server according to claim 5, the at least one processor further configured to process the instructions to:
perform relocation of rules on the basis of a change of the event generating source network solution Table,
when the event generating source network solution Table is changed, the rule relocation unit cause the back-end processing server to be a target processing server, while when such a change is a change of an event generating source network ID corresponding to the existing event condition, further cause a processing server corresponding to an event generating source network ID before change to be a target processing server,
perform, with respect to an application rule that the target processing server holds, generation of an transfer rule and calculation of location destination of the application rule, and
when the calculated result is different from a content before updating of the event generating source network solution Table, acquire a state with respect to the application rule from a processing server in which the application rule is registered, to delete the application rule, a state with respect to thereto and the transfer rule from a processing server which holds them, to locate a rule of a newly generated rule location table at a processing server of the corresponding network and to locate the rule along with state acquired in the location of the application rule.

7. An event processing system comprising:
a front-end processing server connected to a front-end network to which an event generating source is connected;
a back-end processing server which processes events collected from processing servers of respective front-end networks; and
a rule distribution server which generates, from application rules registered from an application into respective processing servers to locate the application rules and generated transfer rules at the processing servers,
wherein the rule distribution server includes:
a memory storing instructions; and
at least one processor configured to process the instructions to:
calculate, from an event condition, ID of the front-end network where any event matching the event condition is generated;
register the application rule into the front-end network when events matching the respective event conditions designated by the application rule are all generated on the same front-end network, and if not, register the application rule into the back-end processing server;
generate a processing rule to transfer, with respect to an application rule which has been determined to be registered into the back-end processing server, an event matching the event condition to the back-end processing server; and
register, into the processing server, the application rule and the transfer rule.

8. A rule distribution method of locating, on registering a rule relating to an event processing from an application server, the rule at a front-end processing server connected to a front-end network to which an event generating source is connected and a back-end processing server connected to a back-end network, the rule distribution method comprising:
calculating, from an event condition, an ID of a front-end network where any event matching the event condition is generated;
making a determination when events matching respective event conditions designated by application rules registered from an application are all generated on the same front-end network, the application rule is registered into a processing server connected to the front-end network, while when the events are not generated, the application rule is registered into the back-end processing server;
generating a processing rule to transfer, to the back-end processing server, any event matching the event condition with respect to an application rule which has been determined registered into the back-end processing server, and
respectively registering the generated transfer rules into the corresponding processing servers.

9. A non-transitory computer readable medium that stores a program causing a computer connected to a front-end processing server connected to a front-end network to which an event generating source is connected, and a back-end processing source connected to a back-end network to execute:
calculating, from an event condition, an ID of a front-end network where any event matching the event condition is generated;
making a determination when events matching respect to respective event conditions specified by an application rule registered from application are all generated on the same front-end network, the application rule is registered into a processing server connected to the front-end network, while when those events are not generated, the application rule is registered into the back-end processing server;
generating a processing rule to transfer any event matching the event condition to the back-end processing server with respect to the application rule determined to be registered into the back-end processing server, and
respectively registering the generated transfer rule to the corresponding processing servers.

* * * * *